(12) United States Patent
Tompkins

(10) Patent No.: US 7,356,412 B2
(45) Date of Patent: Apr. 8, 2008

(54) ELECTROMAGNETIC SURVEYING FOR HYDROCARBON RESERVOIRS

(75) Inventor: Michael Tompkins, Houston, TX (US)

(73) Assignee: OHM Limited, Aberdeen (GB)

(*) Notice: Subject to any disclaimer, the term of this patent is extended or adjusted under 35 U.S.C. 154(b) by 0 days.

(21) Appl. No.: 11/671,654

(22) Filed: Feb. 6, 2007

(65) Prior Publication Data

US 2007/0127315 A1 Jun. 7, 2007

Related U.S. Application Data

(63) Continuation of application No. 11/058,529, filed on Feb. 15, 2005, now Pat. No. 7,191,063.

(30) Foreign Application Priority Data

May 6, 2004 (GB) ................. 0410129.1

(51) Int. Cl.
*G01V 3/17* (2006.01)
(52) U.S. Cl. ......................................... 702/2
(58) Field of Classification Search ............... 702/2, 702/13, 14, 7; 324/323, 344
See application file for complete search history.

(56) References Cited

U.S. PATENT DOCUMENTS

| 4,831,383 A | 5/1989 | Ohnishi et al. |
| 6,253,100 B1 | 6/2001 | Zhdanov |

FOREIGN PATENT DOCUMENTS

| GB | 2 382 875 | 6/2003 |
| GB | 2 390 904 | 1/2004 |
| WO | 02/14906 | 2/2002 |
| WO | 2004/034088 A | 4/2004 |

OTHER PUBLICATIONS

Eidesmo, T. et al. "Sea Bed Logging (SBL), a new method for remote and direct identification of hydrocarbon filled layers in deepwater areas." *first break* 20.3 (Mar. 2003): 144-152.

Ellingsrud, S. et al. "Remote sensing of hydrocarbon layers by seabed logging (SBL): Results from a cruise offshore Angola." *The Leading Edge.* (Oct. 2002): 972-982.

(Continued)

*Primary Examiner*—Donald E McElheny, Jr.
(74) *Attorney, Agent, or Firm*—Renner, Otto, Boisselle & Sklar LLP

(57) ABSTRACT

A method of analyzing results from an underwater controlled source electromagnetic (CSEM) survey of an area that is thought or known to contain a subterranean hydrocarbon reservoir is described. The method is based on a wavefield extrapolation of narrow-band electromagnetic field data obtained from pairs of source and receiver locations. The data comprise a plurality of discrete frequencies between 0.01 Hz and 60 Hz. The wavefield extrapolation is performed for each of these discrete frequencies to provide distributions of electromagnetic scattering coefficient as a function of position and depth beneath the survey area. These distributions may then be combined to provide a displayable image of electromagnetic scattering coefficient. The method is able to quickly provide a displayable image that is readily interpretable.

26 Claims, 21 Drawing Sheets

OTHER PUBLICATIONS

Claerbout, Jon F. "Coarse grid calculations of waves in inhomogeneous media with application to delineation of complicated seismic structure." *Geophysics*. 35.3 (Jun. 1970): 407-418.

Lee, Seunghee, et al. "Phase-field imaging: The electromagnetic equivalent of seismic migration." *Geophysics*. 52.5 (May 1987): 678-693.

Zhdanov, Michael S., et al., "Underground imaging by frequency-domain electromagnetic migration." *Geophysics*. 61.3 (May-Jun. 1996): 666-682.

Biondi, Biondo. "Equivalence of source-receiver migration and shot-profile migration." *Geophysics*. 68.4 (Jul.-Aug. 2003): 1340-1347.

Claerbout, J.F. "Fundamentals of Geophysical Data Processing." McGraw-Hill, NY, Chpts. 10-11 (1976).

Claerbout, Jon F., "Toward a Unified Theory of Reflector Mapping" GEOPHYSICS, vol. 36, No. 3, Jun. 1971, pp. 467-481.

Zhdanov, Michael S. et al., "Time-domain electromagnetic migration in the solution of inverse problems", *Geophys. J. Int.* (1997) 131, 293-309.

ELECTROMAGNETIC SURVEYING FOR HYDROCARBON RESERVOIRS

RELATED APPLICATION DATA

This application is a continuation of U.S. patent application Ser. No. 11/058,529 filed on Feb. 15, 2005 now U.S. Pat. No. 7,191,063, which application is hereby incorporated herein by reference in its entirety.

BACKGROUND OF THE INVENTION

The present invention relates to controlled source electromagnetic (CSEM) surveying for oil and other hydrocarbon reserves.

CSEM surveying is a valuable research tool used for locating oil and hydrocarbon reserves. In a typical CSEM survey, an electromagnetic (EM) source and a number of EM receivers are located at or near the seafloor. Signals broadcast by the EM source propagate outwards into the overlying seawater and downwards into the seafloor and subterranean strata. Given the typical resistivity of the respective media, propagation occurs by diffusion of electromagnetic fields. Components of the broadcast signal which are detected by the receivers carry information about the electrical properties of the media with which they have interacted. Subsequent analysis of the received signals based on geophysical inversion techniques allows features of the subterranean strata to be identified. For example, regions of high resistivity which are typically associated with hydrocarbon reserves can be identified. To thoroughly survey an area of seafloor, an EM source would typically be towed over an area of interest so that data for a range of source-receiver geometries can be collected.

Although CSEM surveys can provide a valuable insight into the electrical properties of subterranean strata, conventional CSEM surveying and data analysis techniques are subject to a number of limitations.

Current analysis techniques generally require data to be collected using combinations of specialized source and receiver geometries [1, 2, 3, 4]. This is true both in terms of the relative placement of sources and receivers and their relative orientations. The requirement for data to be collected for a number of particular source-receiver geometries imposes restrictions on how much useful data can be collected during towing of an EM source over an array of receivers. Furthermore, since CSEM surveys are often performed by towing a single EM source over an array of receivers multiple times to provide data for different source-receiver orientations, the surveying process for providing data which are amenable to conventional geophysical inversion analysis techniques can be time consuming.

Attempts to address the difficulties associated with providing data more amenable to conventional inversion analysis have been made. For example, specialized EM source configurations have been proposed [5].

A further limitation of conventional CSEM surveying and data analysis techniques is that they do not quickly provide an easily interpretable output representing the electrical properties of subterranean strata beneath a survey area. This means it can be difficult to react to survey results in real time, for example, to focus on a region which may potentially be of particular interest within a larger area. Typical initial results from a CSEM survey comprise curves representing combinations of data from different source-receiver orientations and for different distances between source and receiver pairings [1]. The functional form of these curves is determined by subterranean resistivity variations. However, their form is not determined in a way which is immediately interpretable to provide estimates of the depth, extent, resistivity etc. of possible subterranean hydrocarbon reservoirs. Instead, geophysical inversion techniques are applied to the data represented by the curves to provide, for example, resistivity maps of the subterranean strata. Although this process can result in accurate subterranean models, the timing and computations necessary for fullwave three-dimensional (3-D) inversion of survey data can be very large. It is not unreasonable for a geophysical inversion analysis of survey data to take several days to complete. In addition, the inversion process often requires much a priori knowledge of the subterranean strata configuration and can demand many trial-and-error parameter adjustments. Furthermore, the nature of geophysical inversion techniques means that they generally result in only smooth earth parameterizations.

Accordingly, there is a need for techniques which allow for less geometrically constrained collection of CSEM survey data and for such data to be quickly represented in an easily interpretable way such that the location and boundaries of hydrocarbon reservoirs can be quickly and intuitively identified.

SUMMARY OF THE INVENTION

According to a first aspect of the invention there is provided a method of analyzing results from an underwater electromagnetic survey of an area that is thought or known to contain a subterranean hydrocarbon reservoir, comprising: providing electromagnetic field data obtained from an underwater controlled source electromagnetic (CSEM) survey at a plurality of discrete frequencies between 0.01 Hz and 60 Hz for specific source and receiver locations; performing a wavefield extrapolation of the data for the source and receiver locations for each of the plurality frequencies so as to provide a corresponding plurality of distributions of electromagnetic scattering coefficient as a function of position and depth; and combining the distributions to provide an output map of electromagnetic scattering coefficient as a function of position and depth.

By applying a wavefield extrapolation to CSEM survey data it is possible to accurately reconstruct variations in electrical properties within the subterranean strata. This can be done much more quickly than conventional inversion analysis. For example, the method can provide a readily interpretable representation of the variation in scattering coefficient within the subterranean strata in a number of minutes for a typical data set. This compares to an inversion analysis which might take several days to complete. This means, for example, that the output map can be displayed to an operator of a CSEM survey as an easily interpretable image in what is in effect almost real time.

In addition, the method does not require detailed a priori knowledge of subterranean strata beneath the survey area. For example, a start model for the wavefield extrapolation may comprise a simple uniform resistivity model. Furthermore, the method may be executed multiple times with the output map from one execution forming the basis of a start model for the wavefield extrapolation of a subsequent execution.

The method may be applied to data collected for arbitrary source and receiver geometries. This allows, for example, useful data to be collected for all locations of a source being towed along an arbitrary path over an array of receivers. There is no requirement for particular survey geometries to be adopted of the kind required for conventional inversion analysis. This reduces the time (and expense) required to perform surveys and provides for much more efficient collection of useful data.

In addition, relatively few components of electromagnetic field are required for the analysis. For example, radial electric and/or magnetic field measurements at only a few discrete frequencies can provide for an acceptable output map. Conventional source(s) and receiver(s) may be used to provide the data, for example, horizontal electric dipole source(s) and receiver(s) may be used.

The proposed scheme is in some ways scientifically related to analysis techniques which have been used in broadband acoustic geophysical surveying. For example, Claerbout [6] describes analysis techniques based on seismic wavefield imaging. In the art, techniques are referred to as geophysical imaging or geophysical migration (as opposed to geophysical inversion).

It has been recognized that geophysical imaging techniques can be applied to broadband passive source EM surveys, e.g. as described by Lee et al [7] and by Zhdanov et al [8]. Passive source EM surveys are based on detecting the response of subterranean strata to naturally occurring broadband magnetotelluric (MT) waves generated in the earth's ionosphere. Lee et al and Zhdanov et al use standard seismic frequency-domain imaging methods applied to MT data. MT data are suitable for such study as they provide broadband signals, for example Zhdanov et al present an analysis of data which spans five decades of frequency (i.e. periods from 0.1s to $10^4$s). Use of other broadband sources has also been contemplated [9]. However, these are very different to the narrow band sources used for CSEM surveying.

The plurality of discrete frequencies according to the present invention may be between 3 or 4 and 15 frequencies. Although more frequencies may be used, for example, up to 20 or 30, the inventor has identified that 15 is normally sufficient, and that 9 frequencies or so represents a suitable compromise between ease of data collection and quality of output map.

Generally speaking, the electromagnetic scattering coefficient will be complex valued. The output map may correspond to a real part, an imaginary part or a combination of real and imaginary parts of the electromagnetic scattering coefficient. These different representations allow maps which are differently sensitive to resistivity variations in the subterranean strata to be produced.

The method may further comprise determining a depth at which energy associated with a component of the data which has not interacted with the earth (i.e. with the subterranean strata at the survey area) is positioned in the output map. This allows the contribution of, for example, an airwave component in the data to be readily identified and accounted for in a displayed image of the output map.

The method does not require simultaneously collected data and may be applied to electromagnetic field data obtained by multiple CSEM surveys of the area undertaken at different times.

According to a second aspect of the invention, there is provided a computer program product bearing machine readable instructions for implementing a method of analyzing results from an underwater CSEM survey according to the first aspect of the invention.

According to a third aspect of the invention, there is provided a computer apparatus loaded with machine readable instructions for implementing the method of analyzing results from an underwater CSEM survey according to the first aspect of the invention.

According to a fourth aspect of the invention, there is provided a method of performing an underwater CSEM survey of an area that is thought or known to contain a subterranean hydrocarbon reservoir, comprising: providing at least one source and at least one receiver for transmission and detection of electromagnetic signals; obtaining electromagnetic field data with transmission and detection at a plurality of discrete frequencies between 0.01 Hz and 60 Hz for specific source and receiver locations; performing a wavefield extrapolation of the data for the source and receiver locations for each of the plurality frequencies so as to provide a corresponding plurality of distributions of electromagnetic scattering coefficient as a function of position and depth; and combining the distributions to provide an output map of electromagnetic scattering coefficient as a function of position and depth.

The data at different ones of the plurality of discrete frequencies may be obtained at the same time with a single source, at the same time with multiple sources or at different times with a single source. The source(s) may be stationary or towed. The receiver(s) may similarly be stationary or towed.

At least one of the discrete frequencies may be a harmonic of another of the discrete frequencies. This type of harmonic relationship allows multiple frequency components to be relatively easily generated from a single source.

BRIEF DESCRIPTION OF THE INVENTION

For a better understanding of the invention and to show how the same may be carried into effect reference is now made by way of example to the accompanying drawings in which:

FIG. 1 schematically shows a surface vessel 14 undertaking CSEM surveying of a subterranean strata configuration;

FIG. 2 is a flow chart schematically showing processing steps for analyzing CSEM survey data according to an embodiment of the invention;

FIG. 3A schematically shows a model 1-D subterranean strata configuration;

FIG. 3B schematically shows the result of applying a wavefield extrapolation analysis to synthetic CSEM survey data comprising different numbers of discrete frequency components for the subterranean strata configuration shown in FIG. 3A;

FIG. 4A schematically shows a model 2-D subterranean strata configuration;

FIGS. 4B-4D show the results of successive iterations of applying a wavefield extrapolation analysis to synthetic CSEM survey data for the subterranean strata configuration shown in FIG. 4A;

FIG. 5A schematically shows a model 1-D subterranean strata configuration;

FIG. 5B schematically shows the result of applying a wavefield extrapolation analysis to synthetic CSEM survey data for the subterranean strata configuration shown in FIG. 5A;

FIG. 6A schematically shows a model 2-D subterranean strata configuration;

FIGS. 6B-6D schematically show respectively the real component, imaginary component and average of real and imaginary components of the results of applying a wavefield extrapolation analysis to synthetic CSEM survey data for the subterranean strata configuration shown in FIG. 6A;

FIG. 7A schematically shows a model 1-D subterranean strata configuration;

FIGS. 7B and 7C schematically show the results of applying a wavefield extrapolation analysis to synthetic CSEM survey data for the subterranean strata configuration shown in FIG. 7A for different start models;

FIG. 8A schematically shows a model 2-D subterranean strata configuration; and

FIGS. 8B-8E schematically show the results of applying a wavefield extrapolation analysis to synthetic CSEM survey data for the subterranean strata configuration shown in FIG. 8A for different start models.

DETAILED DESCRIPTION

FIG. 1 schematically shows a surface vessel 14 undertaking controlled source electromagnetic (CSEM) surveying of a subterranean strata configuration using standard techniques [1]. The subterranean strata in this example includes an overburden layer 8, an underburden layer 9 and a hydrocarbon reservoir 12. The surface vessel 14 floats on the surface 2 of a body of water, in this case seawater 4 of depth h meters. A submersible vehicle 19 carrying a source in the form of a horizontal electric dipole HED transmitter 22 is attached to the surface vessel 14 by an umbilical cable 16. This provides an electrical, mechanical and optical connection between the submersible vehicle 19 and the surface vessel 14. The HED transmitter is supplied with a drive current so that it broadcasts an HED electromagnetic (EM) signal into the seawater 4.

One or more remote receivers 25 are located on the seafloor 6. Each of the receivers 25 include an instrument package 26, a detector 24, a floatation device 28 and a ballast weight (not shown). The detector 24 comprises three orthogonal electric dipole detectors and three orthogonal magnetic field detectors. In other examples, fewer components of EM fields at the receiver may be measured.

The electric dipole detectors are sensitive to components of the electric fields induced by the HED transmitter in the vicinity of the receiver 25, and produce electric field detector signals therefrom. The magnetic field detectors are sensitive to components of the magnetic fields, for example the magnetic flux density, induced by the HED transmitter in the vicinity of the receiver 25, and produce magnetic field detector signals therefrom. The instrument package 26 records the detector signals for later analysis.

Typical resistivities of the respective media 4, 8, 9, 12 mean that EM signal propagation occurs by diffusion of electromagnetic fields. The rate of decay in amplitude and the phase shift of the signal are controlled both by geometric spreading and by skin depth effects. Because in general the underlying strata 8, 9, 12 are more resistive than the seawater 4, skin depths in the underlying strata 8, 9, 12 are longer. As a result, electromagnetic fields measured by a receiver located at a suitable horizontal separation are dominated by those components of the transmitted EM signal which have propagated downwards through the seafloor 6 and interacted with the underlying strata 8, 9, 12 before detection.

A data analysis scheme based on wavefield extrapolation is now described which may be applied to data obtained from a survey of the kind shown in FIG. 1. The analysis is described with reference to an xyz Cartesian coordinate system in which the seafloor 6 is parallel to the xy-plane and increasing depth beneath the seafloor corresponds to increasing z, as indicated in the figure.

Principles of Wavefield Extrapolation

Wavefield extrapolation (also referred to as downward continuation) is a form of wave propagation that uses spatial filtering instead of wave-equation simulation.

In the frequency domain, wavefield extrapolation can be derived from the solution to the 1-D wave equation $$\partial^2 E/\partial z^2 = (ik(z))^2 E. \qquad (1)$$

Solutions for which are of the form $$E(z) = Ae^{ik(z)z} + Be^{-ik(z)z} \qquad (2)$$

where E(z) is the wavefield (electric or magnetic) at subsurface depth z (i.e. at a depth z beneath the seafloor), i is the square-root of −1, k(z) is the electromagnetic wavenumber at depth z and A and B are scaling constants. The right-hand-side of Equation 2 represents a plane-wave solution to the 1-D wave equation. Of particular significance is the fact that at a depth z, E(z) may be represented as a linear combination of an increasing exponential term and a decreasing exponential term. As such, the wavefield E(z) can be considered to comprise a scattered (positive exponential) component and a primary (negative exponential) component in the subterranean strata. For a plane wave propagating between a source location and a receiver location, the wavefield may be computed at (i.e. extrapolated to) any point along its path using a start model corresponding to an assumed distribution of subsurface properties (i.e., $k(z) = \sqrt{\omega\mu\epsilon^2 - i\omega\mu\sigma}$) given the forms of solution shown by Equation 2. The 1-D wavefield extrapolations then become:

$$E^d(z) = E^d(z=0)e^{-i\sum_j k_j dz_j},$$
$$E^u(z) = E^u(z=0)e^{i\sum_j k_j dz_j} \qquad (3)$$

for the primary and scattered wavefields respectively. $E^d$ denotes the primary wavefield (extrapolated from the source signal), $E^u$ denotes the scattered wavefield (extrapolated form the receiver signal). The subterranean strata are considered to comprise a series of layers (depth slices) numbered 1 . . . j . . . downwardly. $k_j$ is the electromagnetic wavenumber in the jth layer and $dz_j$ is the thickness of the jth layer. The exponential terms are the wave extrapolators. The summation over wavenumbers and depth slices demonstrates that the extrapolation is performed recursively from the seafloor where the source(s) and receiver(s) are positioned to depth z—i.e., downward continuation. Any wavefield can be downward continued from the surface to any depth point using one of Equations 3. The exponential in the primary (source) wavefield extrapolation ($E^d$) is negative, because energy is lost with increasing depth due to scattering as the wave travels through the subterranean strata. The opposite is true for the scattered wavefield ($E^u$), since energy is gained as we 'back propagate' surface recorded data into depth. In the above extrapolation, the wavenumber, k(z), is a complex number. Because of this, the wavefield extrapolation is complex valued. Here, the exponential terms can be considered to be spatial phase filters, while the terms $E^{d,u}$ can be considered extrapolation coefficients.

The wavefield extrapolations in Equation 3 only account for plane-wave propagation, so energy due to wave divergence must be considered separately. This may be done by applying a divergence correction to the data prior to extrapolation. However, this is not necessary. This is because the extrapolation process estimates relative subsurface properties, e.g. amplitude ratios. It is possible to scale the distribution to obtain the 'true' property ratios if desired.

The principles of wavefield extrapolation described above assume that physical properties governing wave propagation (e.g. wavenumber) vary in depth only and are constant laterally. Generally speaking, this is not true, but the assumption of no lateral wavenumber variation can apply in cases where the variations are not extreme or structural dips are small. If this assumption is not valid, the wavefield extrapolation should include horizontal wavenumber dependencies. This can be accomplished in many ways, but the most efficient way is to solve a two-dimensional (2-D) wavefield extrapolation finite-difference problem.

Based on the work by Claerbout [9], Lee et al [7], and Zhdanov et al [8], the 2-D wavefield extrapolation problem can be cast in the form of a full-wave finite-difference solution. Because wavefield extrapolation is a form of wave propagation, the process satisfies the Helmholtz Equation. In 2-D, the extrapolation takes the same form for both primary and scattered propagating waves:

$$\left[\frac{\partial^2}{\partial x^2} + \frac{\partial^2}{\partial z^2}\right] E^{u,d}(x, z, w) e^{\pm ik(x,z,w)z} + \qquad (4)$$
$$k^2(x, z, w) E^{u,d}(x, z, w) e^{\pm ik(x,z,w)z} = 0,$$

where $E^u$ corresponds to scattered component (positive exponential) extrapolation coefficients, $E^d$ corresponds to primary component (negative exponential) extrapolation coefficients, and w is angular frequency. Equation 4 corresponds to a subterranean strata in which the electrical properties of the subterranean strata vary in x and z and are constant in y. Now, by differentiating Equation 4 with respect to z, solving for $$\frac{\partial^3 E^{u,d}(x, z, w)}{\partial x^2 \partial z},$$

ignoring $3^{rd}$ derivatives with respect to z, and canceling like-terms, Equation 4 becomes:

$$\frac{\partial^3 E^{u,d}(x, z, w)}{\partial x^2 \partial z} = 2ik \frac{\partial^2 E^{u,d}}{\partial x^2} + (2ik)^2 \frac{\partial E^{u,d}(x, z, w)}{\partial z}. \qquad (5)$$

Since, Equation 5 only has $1^{st}$ derivatives with respect to z, it can be solved by finite-difference techniques. The central-difference solution for Equation 5 is given by Claerbout [9], Lee [7], and Zhdanov [8] and is not be repeated here. However, it is worth mentioning that the solution to this problem requires initial conditions at the Earth's surface (both the recorded scattered field and source primary field (source function)) and a left and right boundary condition at each depth. If these conditions are satisfied, the linear system resulting from the discretization of Equation 5 can be solved explicitly using a simple depth slicing and back-substitution algorithm. The left and right boundary conditions may be specified by a 1-D analytical continuation of the source and receiver fields at the edges of the migration domain (i.e. the region over which wavefield extrapolations are made).

Since the electric and magnetic Helmholtz Equations are of the same form, we can use this 2-D extrapolation solution for either electric (E) or magnetic (H) fields, as well as any sub-component of these fields.

After solving for $E^{u,d}$, the values may be substituted into an equation corresponding to Equation 3 for the 1-D case in order to compute the wavefields from the computed extrapolation coefficients ($E^{u,d}$). This provides the downward continued EM fields in the subterranean strata.

Diffusive Wavefield Imaging

After downward continuation of both the source and recorded wavefields to all points in the subsurface region of interest, an imaging condition may be applied at each subsurface location to produce desired physical property image reconstructions (wavefield imaging). Following the work of Claerbout [6, 9], if there exists a point of scatter in the subsurface, then the phase of the primary and scattered travelling waves are identical at that point (due to continuity of energy). This means that if the primary and scattered extrapolated wavefields are summed taking due account of phase, they will add to a constant value at the scatter point (where they are in phase) and subtract elsewhere. This principle allows us to create an image of the subsurface by scanning model space (the region over which extrapolations are made in the subterranean strata (subsurface)) and identifying where energy from the extrapolated fields adds and subtracts.

To cast this idea in mathematical terms, the imaging condition at a point (x,z) in model space (e.g. on a computational mesh over which the analysis is performed) for electromagnetic field data E is defined as the complex scattering coefficient ($\overline{Scat}$):

$$\overline{Scat}(x, z, w) = \frac{1}{j} \sum_{i=1}^{receivers} \sum_{j=1}^{freq} \left\{\frac{\overline{E^u}(x, z, w)}{\overline{E^d}(x, z, w)}\right\} \qquad (6)$$

where a bar over a term denotes that it may be complex valued, $E^{d,u}$ are the extrapolated wavefields, receivers is the number of receivers in the survey, and freq is the number of frequencies acquired in the survey. To produce a subsurface conductivity image, the wavefield extrapolation as shown in Equation 3 (1-D) or Equation 5 (2-D) are performed and the ratio of the primary and scattered wavefields at each point (x,z) in the model space determined.

Since this process of phase-field imaging and continuation is performed in the frequency domain, the expression shown in Equation 6 averages over multiple frequencies. In addition, an image may be produced for each source-receiver pairing and these can be summed. This is similar to shot-profile migration (see, for example, Biondo [10]). As shown by Zhdanov [8], the scattering coefficient is an identifier of geoelectric boundaries. By normalizing the amplitude of the complex scattering coefficient, $$\overline{Scat}^N(x, z, w) = \frac{\overline{Scat}(x, z, w)}{|\overline{Scat}(x, z, w)|} = \exp(i(phi^u - phi^d)), \qquad (7)$$

the result depends only on the phase difference between the downward continued primary and scattered wavefields.

Accordingly, only phase information is required as an electromagnetic field data input, the method being insensitive to amplitudes.

At a scattering point (or boundary), the phase is constant (and independent of frequency), while away from that point, the phase difference varies. So, if images at different frequencies are averaged, the images will constructively interfere at scatter points (geoelectric boundaries) and destructively interfere elsewhere. Such is the process of creating a diffusive wavefield migrated image from recorded electromagnetic field data. Although the geoelectric scattering coefficient $\overline{Scat^N}$ is a complex-valued parameter, images can be formed, for example, using only the real part of the complex scattering coefficient:

$$Scat^N(x,z,w) = \frac{1}{j}\sum_{i=1}^{receivers}\sum_{j=1}^{freq} \Re\left\{\frac{\overline{Scat}(x,z,w)}{|\overline{Scat}(x,z,w)|}\right\} = (phi^u - phi^d), \quad (8)$$

FIG. 2 schematically shows steps of an algorithm developed by the inventor for applying the above described analysis to CSEM survey data collected during surveys of the kind shown in FIG. 1.

In step S1, details of the survey data to be analyzed are determined (or defined in the case of modeling). These include identifying the relative locations of specific source-receiver pairing (e.g. their separation and positions over a survey area) and the frequency components comprising the data.

In step S2, a computational mesh corresponding to a model space is defined (i.e. the region over which extrapolations are to be made in the subterranean strata).

In step S3, the survey data are provided. These comprise electric and/or magnetic field data, after subtraction of a "primary" source field from the measured data, and also details on the source signal broadcast by the transmitter. Step S3 may include pre-processing of the electric field data, for example to determine a radial component, or an amplitude of a major axis of a polarization ellipse governed by orthogonal horizontal components of detected electric or magnetic fields to be used as the basis for further processing.

In step S4, a start (initial) model is selected to be used in the wavefield extrapolation. As will be seen later, this may conveniently comprise a uniform resistivity half-space, for example having a resistivity similar to that of an expected large scale background resistivity of the survey area.

In step S5, extrapolation coefficients are determined for subsurface locations on the computational grid defining model space. In the 2-D case, these are determined, for example, by solving Equation 5 for $E^{u,d}$ for each specific source location and receiver location pairings and frequency.

In step S6, a downward continuation is performed based on the relationship given in Equation 3.

In step S7, the electromagnetic scattering coefficient (Scat) is determined from the extrapolated wavefields according to the relationship shown in Equation 7. This is done throughout the model space defined in step S2 to provide a distribution of electromagnetic scattering coefficient as a function of position and depth.

Steps S4 to S7 are repeated for each frequency component and each source-receiver pairing comprising the survey data, as indicated by step S8. (In a minimal configuration, there may only be a single source-receiver pairing.)

In step S9, the plurality of output maps determined in the repeated executions of steps S4 to S7 made according to step S8 are combined to provide an output map of electromagnetic scattering coefficient in the survey area as a function of position and depth.

Although not necessary, in this example, the method is employed iteratively, as indicated by step S10. In step S10, a revised start model based on the output map is generated. Processing returns to step S4 for another iteration of steps S4 to S9 in which the start model used is the revised start model based on the output map. Step S10 may be executed any desired number of times, for example three. Once the desired number of iterations via step S10 are complete, processing proceeds from step S9 to step S8. In step S11, the output map is displayed as an image, for example, an image representing a structural cross-section of scattering coefficient in model space.

It will be appreciated that the steps shown in FIG. 2 need not necessarily be performed in the order shown. Furthermore, it will be appreciated that not all of the steps will be required in some implementations. For example, it will not always be necessary to display the output map as an image (i.e. step S11 not used) or only a single iteration to be made (i.e. step S10 not used).

Algorithms based on the processing shown in FIG. 2 have been used to examine the applicability of wavefield extrapolation techniques to data of the kind obtained in CSEM surveys and used to generate the results described below.

Frequency Effects on Wavefield Imaging

FIG. 3A schematically shows a model 1-D subterranean strata configuration used to show the effect of applying the above described wavefield imaging analysis to synthetic CSEM survey data comprising different numbers of discrete frequency components. Boundaries between different layers in the subterranean strata are shown as dashed lines. Depth (d) below sea-level is marked on the left-hand side of the figure. The model strata configuration comprises four layers which are located beneath a seafloor 6 with a body of seawater 30 above them. The seawater 30 is 7000 m deep and has a resistivity of 0.3 Ωm. A first subterranean layer 32 is 1300 m thick and has a resistivity of 1 Ωm. A second subterranean layer 34 is 750 m thick and has a resistivity of 50 Ωm. A third subterranean layer 36 is 2250 m thick and has a resistivity of 1.33 Ωm. A fourth subterranean layer 38 is 3700 m thick and has a resistivity of 1.5 Ωm. This arrangement broadly corresponds to that of a hydrocarbon reservoir (represented by the second layer 34 having a relatively high resistivity) located in a background strata configuration having a lower but increasing resistivity with depth. This type of increasing resistivity background is typical due to the progressive expulsion of conducting seawater from pore spaces in sediments comprising the subterranean strata due to rising overburden pressure.

FIG. 3B plots the real part of the scattering coefficient (Scat) calculated using the above described wavefield imaging analysis for the model subterranean strata configuration shown in FIG. 3A as a function of depth beneath sea-level (d). Curves of scattering coefficient as a function of depth are shown for CSEM survey data having different numbers of discrete frequency components. (Examples of how multi-frequency component data may be collected in practice are described further below.) The curve marked 1F corresponds to single frequency CSEM survey data at 5 Hz. The curve marked 8F corresponds to CSEM survey data comprising eight discrete frequency components in the range 0.1 to 1 Hz. The curve marked 14F corresponds to CSEM survey data comprising fourteen discrete frequency components in the range 0.1 to 5 Hz. The curve marked 30F corresponds to CSEM survey data comprising thirty discrete frequency components in the range 0.1 to 90 Hz. Scattering boundaries (corresponding to boundaries between layers having significantly different resistivities) become most clearly defined when the analysis is applied to data having more frequency components. Increasing the number of frequencies improves the resolution of the boundaries of the relatively highly resistive second layer 34 and also reduces side-lobe oscillations away from the layer (apparent in FIG. 3B as scattering coefficient extrema located away from layer boundaries). In this case, however, using 30 frequencies does not significantly improve the 1-D image compared to using 14 frequencies. This is an important result, since in practice it becomes more difficult to provide CSEM survey data having large numbers of frequency components. This is due to the fundamentally narrowband nature of CSEM survey data. It can be seen that, contrary to what might be expected, reasonable images can be obtained with only a few discrete frequency components, for example, 8 or 14 in a frequency range that is low enough for the components to penetrate to a suitable subterranean depth and to be realizable in practice with existing EM sources (e.g. 0.01-60 Hz). It has been found that acceptable results can be generated using as few as 3 or 4 discrete frequencies between 0.01 Hz and 5 Hz. Wavefield imaging analysis techniques have previously been considered to be applicable only to broadband higher frequency data, for example broadband seismic data or the naturally occurring broadband MT electromagnetic data.

Contrasts Between Wavefield Imaging Analysis and Conventional Inversion Analysis:

Spatial Resolution

Because the wavefield imaging analysis described above is performed in the frequency domain, discrete measurements at separate center frequencies are 'combined' in the analysis to form a frequency averaged response of the subterranean strata comprising the Earth's subsurface. In typical EM inversions, however, this is not strictly possible, since multiple frequency data typically provide only for data redundancy. While it is true that different frequencies may provide for different sampling of the subterranean strata (due to differing skin depths), the combination of these data do not provide the frequency averaging inherent in the above described wavefield imaging analysis. In Tikhonov-Regularized inversion, a single 'smoothed' reconstruction of the subsurface must be reconcilable for data at all frequencies. In the wavefield imaging, however, multiple 'rough' reconstructions are performed and added or otherwise combined to form a single image. As a result, wavefield imaging can produce relatively high resolution reconstructions of geoelectric boundaries in the subterranean strata, while inversion produces relatively low-resolution reconstructions.

The reason why wavefield imaging is 'high' resolution, while inversion is 'low' resolution is because of the required stabilization in the inversion process. Inversion problems are typically constrained to be 'smooth' representations of the subterranean strata, because the mathematical inverse process is unstable. Smooth solutions can often reduce EM inversion resolution to the extent of frequency independence. The 2-D wavefield imaging described here is based on a stable mathematical process and is therefore stable in itself. As a result, no stabilization (smoothing) is required, and relatively high resolution images are possible—provided sufficient frequency content is present in the data. In addition, the imaging condition (Equation 6) used to produce wavefield imaging images is a localized operator governed spatially only by the finite-difference stencil and the wavefield properties themselves.

Although it is possible to solve the EM inverse problem without smoothness constraints, when applied to unconstrained 2-D or 3-D inversion of CSEM data, the instability and non-uniqueness of the solution is usually too great.

Computational Efficiency

One of the most apparent differences between conventional inversion analysis and wavefield imaging according to embodiments of the invention is the speed at which solutions can be achieved. The computational efficiency of inversion is dependent on the method used to perform the 'inverse' operation. If an exact inverse solution is sought, the number of computations needed is at least of order $N^2$, N being the number of unknowns, given by all null-space methods. This can increase to order $N^3$ if conventional matrix inverse methods are used (e.g., Gauss-Newton type solutions). For wavefield imaging, solutions having only forward computations to solve can be provided. In some cases, implicit finite-difference forward solvers can still require $N^2$ computations to solve, but there is no additional inverse computation to perform. In addition to the time saved by avoiding inverse computations, wavefield imaging (using downward continuation) can be performed by explicit finite-difference operations. The 2-D implementation employed here uses such an explicit solver and requires only order N computations to solve. The end result is a solution that requires orders of magnitude less time to solve than a similarly sized inverse solution. Experiments based on the processing shown in FIG. 2 have shown that a 2-D wavefield imaging on a computational mesh having dimensions of ~250×200 elements takes about 1 minute to solve on a Pentium IV, Linux Workstation.

Example Results

FIG. 4A schematically shows in vertical cross-section a model 2-D subterranean strata configuration beneath an area of seafloor 6. The model comprises a wedge shaped structure 40 having a resistivity of 100 $\Omega$m embedded in a uniform background having a resistivity of 1 $\Omega$m. The upper edge of the wedge 40 is approximately 2000 m below the seafloor. The wedge is around 800m thick and has a horizontal extent of around 6000 m at its base. Depth (d) below sea-level is marked on the left-hand side of the figure. Horizontal location (x) measured from an arbitrary origin is marked along the bottom.

FIG. 4B is a grayscale plot schematically showing the real component of the scattering coefficient (Scat) calculated using the above described 2-D wavefield imaging analysis for the model subterranean strata configuration shown in FIG. 4A as a function of depth beneath sea-level (d) and horizontal position (x). A shade bar to the right of the figure shows the relationship between grayscale shade and scattering coefficient value. The image is generated using synthetic CSEM electric field data comprising eight discrete frequency components (0.125, 0.25, 0.375, 0.75, 1, 1.25, 3 and 5 Hz) collected for 23 receiver (Rx) positions and 6 source (Tx) positions distributed in a line along the seafloor 6 in the plane of FIG. 4B. The initial resistivity model used for the extrapolations is a uniform half-space with resistivity 1 $\Omega$m. The transmitter is a horizontal (i.e. parallel to seafloor 6) electric dipole antenna extending in the plane of the figure. The data comprise the amplitudes of horizontal electric field measured in the plane of the figure at each frequency for each source-receiver pairing. This component of the field is often referred to as the inline component. The location of the upper boundary of the wedge feature seen in FIG. 4A is apparent as a bright region (high negative scattering coefficient). The dark region (high positive scattering coefficient) immediately below this is an "overshoot". The reason the lower boundary is not so apparent is because the start (initial) model assumed for the wavefield imaging (i.e. uniform half-space with resistivity 1 Ωm) is only accurate to the top of the wedge structure. This is because extrapolations for depths below this do not incorporate the effect of the high resistivity of the wedge itself.

FIG. 4C is similar to and will be understood from FIG. 4B. However, FIG. 4C corresponds to a second iteration of the wavefield imaging process. The second iteration is similar to the first iteration, but uses a start model based on the results of the first iteration shown in FIG. 4B, rather than a uniform half-space. In particular, the start model used for the extrapolation plotted in FIG. 4C uses the parameter:

$$\left(\frac{1-Scat}{1+Scat}\right)^2 \cdot \rho_{model} \quad (10)$$

calculated for each location in the subterranean strata as the start model. In Equation 10, $\rho_{model}$ is the start model of the initial iteration (uniform half-space) and Scat is the real component of the scattering coefficient plotted in FIG. 4B.

The updated start model used for the second iteration allows the lower boundary of the wedge to be identified. This is apparent from the greater vertical extent of the bright region in FIG. 4C compared to that of FIG. 4B.

FIG. 4D is similar to and will be understood from FIGS. 4B and 4C. However, FIG. 4D corresponds to a third iteration of the wavefield imaging process. The third iteration is similar to the second iteration, but uses a start model based on the results of the second iteration shown in FIG. 4C in the same way as described above for the second iteration.

It can be seen from FIG. 4D that both the upper and lower boundaries of the wedge are clearly defined and that there is relatively little blurring or "overshoot" present beneath the wedge compared to the image shown in FIGS. 4B and 4C.

These types of images allow for direct interpretation of subsurface resistivity and may also be used to provide independent geometric constraints for conventional inversion analysis.

Data Collection

As can be seen from FIGS. 3B and FIGS. 4B-D, narrowband CSEM data, e.g. data containing, for example, fourteen or fewer, frequency components spanning only a few hertz (for example between 0.01 and 5 Hz), or possibly up to 60 Hz, can provide acceptable images of subterranean strata. This is surprising since wavefield imaging techniques have hitherto being considered only suitable for application to broadband data. For example, the application of wavefield imaging to broadband naturally occurring MT waves described by Zhdanov et al [8] employs data at 68 frequencies spanning five decades of period (periods between 0.1 and $10^4$ seconds). CSEM surveys using current source technology are unable to provide this kind of broadband signal and only relatively few frequency components are available for practical surveys.

There are a number of ways in which CSEM data comprising, for example, around fifteen discrete frequency components can be obtained using equipment of the kind shown in FIG. 1. Generally speaking, most CSEM survey data are obtained with the source antenna broadcasting at a single frequency, usually in the range of around 0.01 to 0.5 Hz, but sometimes up to 5 Hz or higher, for example up to 60 Hz. The frequency chosen for a given survey will be based on a consideration of skin depth effects and a desired depth sensitivity. Lower frequencies are generally used to probe deeper into the subterranean strata due to their longer skin depths.

A CSEM source spectrum generally comprises a fundamental frequency and a small number, perhaps two or three, harmonics. A suitable drive signal for the source antenna can be chosen such that significant power is output at each of the fundamental and the two or three harmonic frequencies. It is possible to provide a drive signal for the source for which power is distributed amongst more harmonics, but this can lead to problems with providing enough power in each harmonic for a practical survey.

Another way to provide more frequency components is to make multiple passes over an area of interest during a survey while collecting data at different frequencies during each pass (tow). For example, to provide CSEM survey data having nine frequency components, three passes may be made with a source broadcasting significant power at three different frequencies each time (i.e. a fundamental and two harmonics). For example, a first tow over a survey area may be made with the source broadcasting at a fundamental frequency of 0.125 Hz and having significant power in the third and fifth harmonics (0.375 Hz and 0.625 Hz). A second tow may then be made over the same path with the source broadcasting at a fundamental frequency of 0.25 Hz and again with significant power in the third and fifth harmonics (0.75 Hz and 1.25 Hz). Finally, a third tow may be made with the source broadcasting at a fundamental frequency of 1 Hz with significant power in the third and fifth harmonics (3 Hz and 5 Hz). Since the three tows are made over the substantially the same path, at each point along this path data representing the EM coupling between the source and each receiver at nine frequencies (0.125, 0.25, 0.375, 0.625, 0.75, 1, 1.25, 3 and 5 Hz) are provided. It will be appreciated that multiple sources broadcasting at, for example, three frequencies each could be employed simultaneously to provide a desired number of discrete frequencies. The multiple source could be towed by a single vessel, so removing the need for multiple tows over the same paths.

EM Data Components

It is generally understood that multiple field components (i.e. detected fields resolved along multiple directions, e.g. radially and azimuthally with respect to a line connecting between a source and receiver) are an asset in electromagnetic inversion. This is because different source-receiver configurations have different sensitivity functions, so they are sensitive to different spatial distributions of subterranean electrical properties. An example is the so-called inline and broadside electric field measurement [1]. Since the inline configuration is a co-axial or radial type measurement, it senses deeper than the co-planar broadside configuration. Combining data for both measurements is useful when inverting electric field data, because each configuration adds to the constraint of the inversion at different depth levels reducing inversion ambiguity. A negative aspect of using multiple data components is the need to record them. In order to record true inline and broadside fields, either orthogonal receiver positions or orthogonal source towlines are required. Compromising geometries can be used (e.g. oblique towlines), but the recorded data components will be not be pure. At any rate, the need for multiple data components increases both acquisition efforts and costs.

In contrast, with wavefield imaging, although multiple components may be helpful in adding azimuthal information (e.g. for 3-D imaging), they are not needed to produce 2-D images of the subterranean strata. Surface wavefields are continued (extrapolated) into the earth at all points. This means that a resulting image can distinguish between energy at shallow depths and deep depths for each component of data. As a result, the only limiting factor is total depth sensitivity (energy has to have originally propagated to any given depth to image that point). This is not a problem, because it is always possible to increase measurement depth sensitivity by increasing the source-receiver offset distance. Therefore, even though different data components offer additional information, they are not necessary to image multi-dimensional structure in isotropic media. However, if anisotropy exists, multiple data components help distinguish between various electrical properties at each subterranean location (conductivity becomes a tensor at all subterranean locations).

Airwave Effects

An important consideration in subterranean EM interpretation in shallower waters is the interference of so-called 'airwave' energy with energy that has propagated into the subterranean strata [1]. This airwave energy, which has propagated in a near perfect waveguide from the source, through the sea, and to receivers, can complicate the interpretation of CSEM data if it interferes with the target signal. This can happen because the wavefield imaging process attempts to extrapolate the airwave energy into the subterranean strata. However, in principle, the wavefield imaging will position the airwave energy at a subterranean location that can be determined and which is distinguishable from other subterranean target signals. The airwave signal will only cause possible confusion if it is positioned at the same subterranean depth as a target body.

The wavefield imaging process acts to position (migrate) airwave energy into the subsurface. However, the migration uses an inappropriate wavenumber (i.e. the start model subterranean resistivity is generally higher than that of the seawater through which the airwave passes). Because of this, the wavefield imaging does not merely position the airwave energy at a depth beneath the seafloor corresponding to the depth of the seawater overlying the seafloor. Instead, the airwave energy is positioned at a depth corresponding to the depth of the overlying seawater scaled by a parameter which is proportional to the difference in the wavenumbers between the subterranean strata and the seawater. The depth of the migrated airwave energy will be proportional to the ratio of skin-depths in the seawater ($\delta_\omega$) and the average of the subterranean strata ($\delta_\varepsilon$). Accordingly, to determine the position of the airwave energy in the subterranean strata, it is simply necessary to compute the ratio:

$$\frac{\delta_\varepsilon}{\delta_\omega} = \sqrt{\frac{\frac{2}{\omega\mu\sigma_\varepsilon}}{\frac{2}{\omega\mu\sigma_\varpi}}} = \sqrt{\frac{\sigma_\omega}{\sigma_\varepsilon}}. \quad (11)$$

Where $\sigma_\varepsilon$ and $\sigma_\omega$ are the conductivities (inverse of resistivity) of the seawater and average subterranean strata respectively.

FIG. 5A schematically shows in vertical cross-section a model 1-D subterranean strata configuration beneath an area of seafloor 6 used to demonstrate the effect of the airwave energy component of synthetic CSEM data. The seafloor 6 is located beneath a body of water having a depth of 1620 m and a resistivity of 0.3 Ωm. The subterranean strata model comprises a horizontal layer 50 having a resistivity of 100 Ωm embedded in a uniform background having a resistivity of 1 Ωm. The upper edge of the layer 50 is approximately 1200 m below the seafloor and the layer 50 is around 700 m thick. Depth (d) below sea-level is marked on the left-hand side of the figure. Horizontal location (x) measured from an arbitrary origin is marked along the bottom.

FIG. 5B is a grayscale plot schematically showing the real component of the scattering coefficient (Scat) calculated using the above described wavefield imaging analysis for the model subterranean strata configuration shown in FIG. 5A as a function of depth beneath sea-level (d) and horizontal position (x). The data are plotted according to the same shade bar as that shown in FIG. 4B. The image is generated using synthetic CSEM electric field data comprising eight discrete frequency components (0.125, 0.25, 0.5, 0.75, 1.0, 1.25, 2.5 and 5.0 Hz). A start model for the wavefield imaging corresponding to the known distribution of subterranean resistivity (i.e. according to the model shown in FIG. 5A) has been used. This technique of using a known subterranean resistivity variation as a start model for the wavefield imaging is referred to here as using an exact start model.

The presence of the horizontal layer 50 in the wavefield imaging can be seen as a horizontal band in FIG. 5B at the appropriate depth. However, also seen in FIG. 5B is a bright band 52 at a greater depth. This band corresponds to the presence of the airwave energy which the wavefield imaging process has erroneously extrapolated into the subterranean strata. The airwave has propagated through a depth of 1620 m of seawater having a resistivity of 0.3 Ωm. However, the wavefield imaging process assumes the airwave energy has been travelling through the subterranean strata, most of which has a resistivity of around 1 Ωm. This means the wavefield imaging locates the airwave energy at a greater depth below the seafloor 6 than it actually travels above it. In accordance with the relationship shown in Equation 11, the airwave energy is located at a depth beneath the seafloor of 1.77 times the depth of the seawater, i.e. at a depth beneath the sea-level of (1.77+1)*1620 m=4487 m. This is the depth d at which the bright band 52 seen in FIG. 5B appears. Since in a CSEM survey the seawater depth, seawater resistivity and the bulk resistivity of the Earth are generally relatively well known, the depth at which airwave energy, i.e. energy which has not interacted with the earth, will appear can be determined and so ignored or subtracted from resulting output images.

Imaging with Complex Scattering Coefficients

Electromagnetic wavefield imaging generally produces complex-valued scattering coefficients (due to the complex nature of the wavenumbers). In the images shown in FIGS. 3B, 4B-4D and 5B it is the real part of the complex scattering coefficients which are plotted. However, there is information in both the real and imaginary parts of the extrapolated wavefields and the resulting images.

FIG. 6A schematically shows in vertical cross-section a model 2-D subterranean strata configuration beneath an area of seafloor 6 used to investigate the difference between the real part, imaginary part, and combined real-imaginary scattering coefficients. The seafloor 6 is located beneath a body of water having a depth of 7120 m and a resistivity of 0.3 Ωm. The subterranean strata model comprises a block structure 70 having a resistivity of 100 Ωm embedded in a background comprising an upper layer 72 having a resistivity of 1 Ωm and thickness around 4500 m and a semi-infinite lower layer 74 having a resistivity of 1.5 Ωm. Depth (d) below sea-level is marked on the left-hand side of the figure. Horizontal location (x) measured from an arbitrary origin is marked along the bottom.

FIG. 6B is a grayscale plot schematically showing the real component of the scattering coefficient (Scat) calculated for the model subterranean strata configuration shown in FIG. 6A. FIG. 6B is similar to and will be understood from FIGS. 5B. Again, an exact start model has been used. The presence of the block 72 in the model shown in FIG. 6A can be clearly seen in FIG. 6B. There is a small amount of horizontal bleeding giving rise to a slightly banded structure. It is believed that this artifact is caused by poor data coverage at the edges of the survey area.

FIGS. 6C and 6D are similar to FIG. 6B but respectively plot the imaginary component and the average of the real and imaginary components of the scattering coefficient (as opposed to the real component plotted in FIG. 6B).

It can be seen from FIG. 6C that the imaginary component does not properly resolve the top of the block 72. It does, however, image the bottom of the block reasonably well. Although the precise reasoning for this is not yet known, it is possible that the imaginary component of the scattering coefficient is dominated by induced fields inside the resistive block 72 rather than scattered fields at the surface of the block. If it is true that the imaginary component of the wavefield is dominated by inductive fields, it may be possible to better image the interior of a body compared to the edge of the body. The real component of the wavefield (and hence of the scattering coefficient) is dominated by scattered energy at the interface of inhomogeneities in the subterranean strata. As a result, real-valued images (e.g. as shown in FIG. 6B) should produce a better indication of interfaces compared to imaginary component images (e.g. as shown in FIG. 6C).

For the average of the real and imaginary components of the scattering coefficients shown in FIG. 6D, the image is not a significant improvement on the real component image (FIG. 6B) and is worse in many areas near the block 72.

This demonstrates how different combinations of the real and imaginary components of scattering coefficient can be made to provide images which are differently sensitive to resistivity variations in the subterranean strata.

Start Model Effects on CSEM Imaging

As described above, the wavefield imaging process relies on an assumed start model of the resistivity in the subterranean strata. In general, the true subterranean resistivity variation will not be known and wavefield imaging will accordingly include some degree of inaccuracy.

FIG. 7A schematically shows in vertical cross-section a model 2-D subterranean strata configuration beneath an area of seafloor 6 used to investigate the effect of using different start models. The seafloor 6 is located beneath a body of water having a depth of 7120 m and a resistivity of 0.3 Ωm. The subterranean strata model comprises a horizontal layer 80 having a resistivity of 100 Ωm embedded in a background comprising an upper layer 82 having a resistivity of 1 Ωm and a semi-infinite lower layer 84 having a resistivity of 1.5 Ωm. Depth (d) below sea-level is marked on the left-hand side of the figure. Horizontal location (x) measured from an arbitrary origin is marked along the bottom.

FIG. 7B is a grayscale plot schematically showing the real component of the scattering coefficient (Scat) calculated for the model subterranean strata configuration shown in FIG. 7A as a function of depth beneath sea-level (d) and horizontal position (x). The data are plotted according to the same shade bar as that shown in FIG. 4B. The image is generated using synthetic CSEM electric field data comprising fourteen discrete frequency components (0.1, 0.125, 0.25, 0.5, 0.6, 0.75, 0.9, 1.0, 1.25, 2.0, 2.5, 3.0, 4.0 and 5.0 Hz). An exact start model for the wavefield imaging corresponding to the known distribution of subterranean resistivity (i.e. according to the model shown in FIG. 7A) is used. The image shown in FIG. 7B is seen to closely match the model shown in FIG. 7A.

FIG. 7C is similar to and will be understood from FIG. 7B, but is generated using a uniform resistivity start model comprising an infinite half-space of resistivity 1 Ωm rather than the exact start model resistivity used to generate FIG. 7B. It is apparent that the image shown in FIG. 7C also closely matches the model shown in FIG. 7A, notwithstanding the use of a much simplified start model. This demonstrates that although an exact start model generally produces better images, an accurate image can still be produced without such complete a priori information about the subterranean strata. Even with what might be considered an inappropriate start model, the image shown in FIG. 7C provides the correct position of the horizontal layer 82 (~1500 m below the seafloor) and detects the presence of the geoelectric interface near 5200 m below the seafloor. The thickness of the layer (1500 m) is also well matched. This demonstrates that a simple uniform resistivity half-space can be used as a suitable start model. As shown in FIGS. 4B-4D, resulting images can be improved upon by iteratively applying the wavefield imaging process (i.e. executing the method multiple times) with the start model for a subsequent iteration being based on the output image from a previous iteration.

FIG. 8A schematically shows in vertical cross-section a model 2-D subterranean strata configuration beneath an area of seafloor 6 used to demonstrate the effect of using different resistivity half-space start models for the wavefield imaging. The model comprises a wedge shaped structure 90 having a resistivity of 100 Ωm embedded in a uniform background having a resistivity of 1 Ωm. This structure is similar to that shown in FIG. 4A. Depth (d) below sea-level is marked on the left-hand side of the figure. Horizontal location (x) measured from an arbitrary origin is marked along the bottom.

Figure 8A:
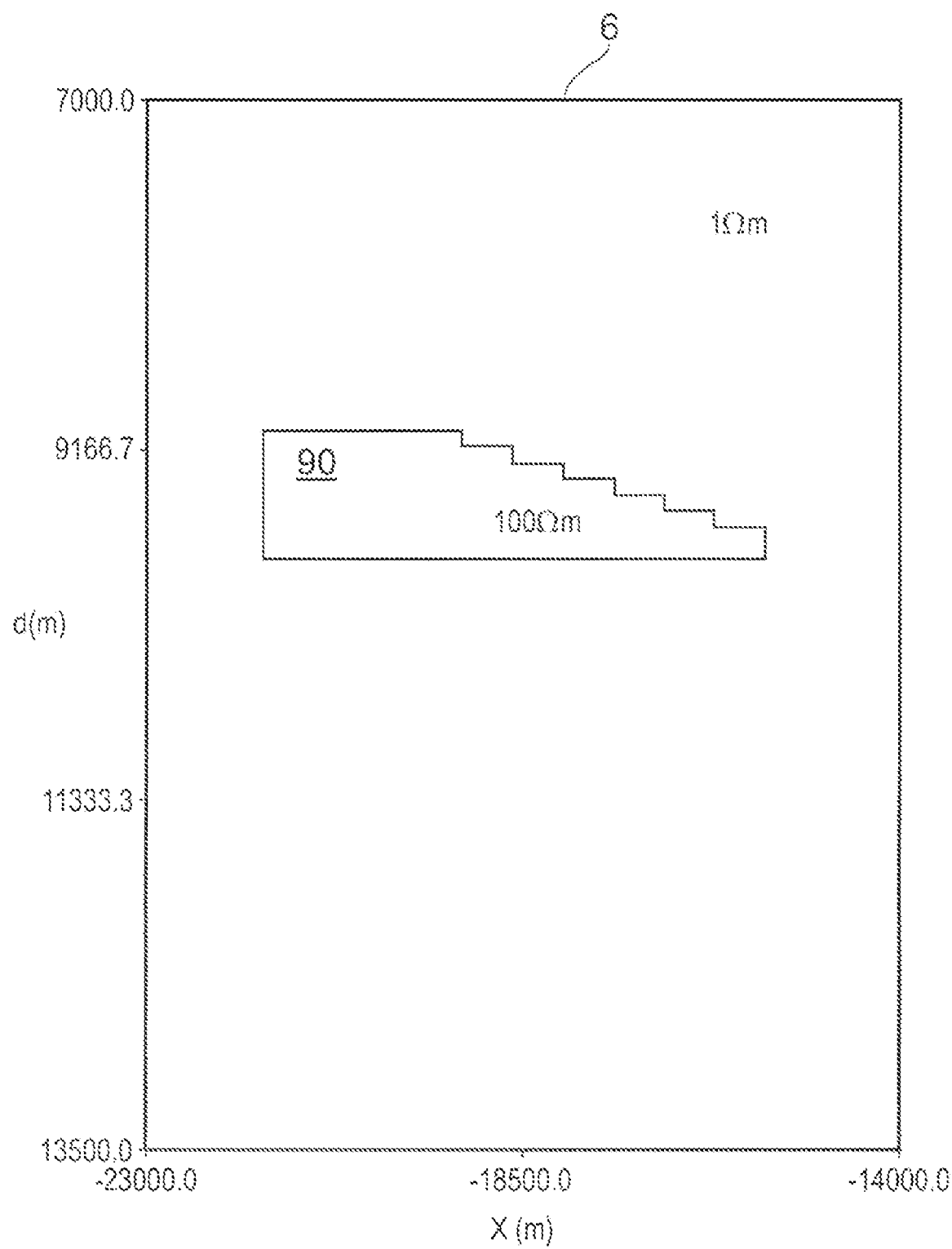
FIG. 8B is a grayscale plot schematically showing the real component of the scattering coefficient (Scat) calculated for the model subterranean strata configuration shown in FIG. 8A with an exact start model used in the wavefield imaging. The presence of the wedge structure is clearly seen in the image.
FIGS. 8C-8E are similar to and will be understood from FIG. 8B, but are generated using uniform resistivity start models comprising infinite half-spaces of resistivities 0.5 Ωm 1 Ωm and 2 Ωm respectively, rather than the exact start model used to generate FIG. 8B.
Figure 8B:
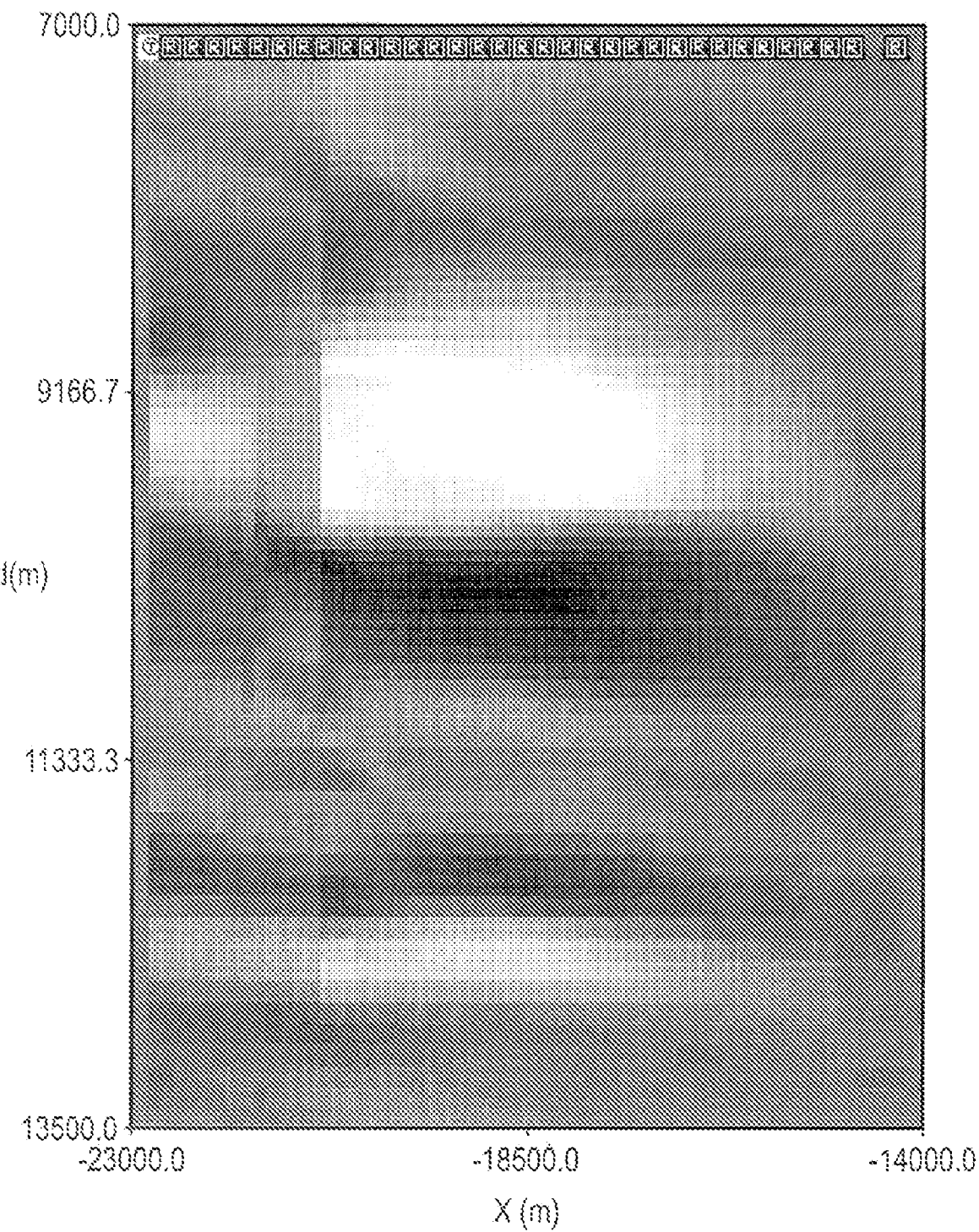

The effect of choosing too low a resistivity for the uniform half-space start model is that the wavefield imaging under-migrates the image, and positions structures too shallowly. This is apparent from FIG. 8C where a uniform resistivity half-space start model of 0.5 Ωm is used rather than the more realistic value of 1 Ωm seen in the large-scale background in FIG. 8A. The wedge 90 is accordingly calculated to be positioned at too shallow a depth.

The effect of choosing too high a resistivity for the uniform half-space start model is that the wavefield imaging over-migrates the image, and positions structures too deeply.

Figure 8C:
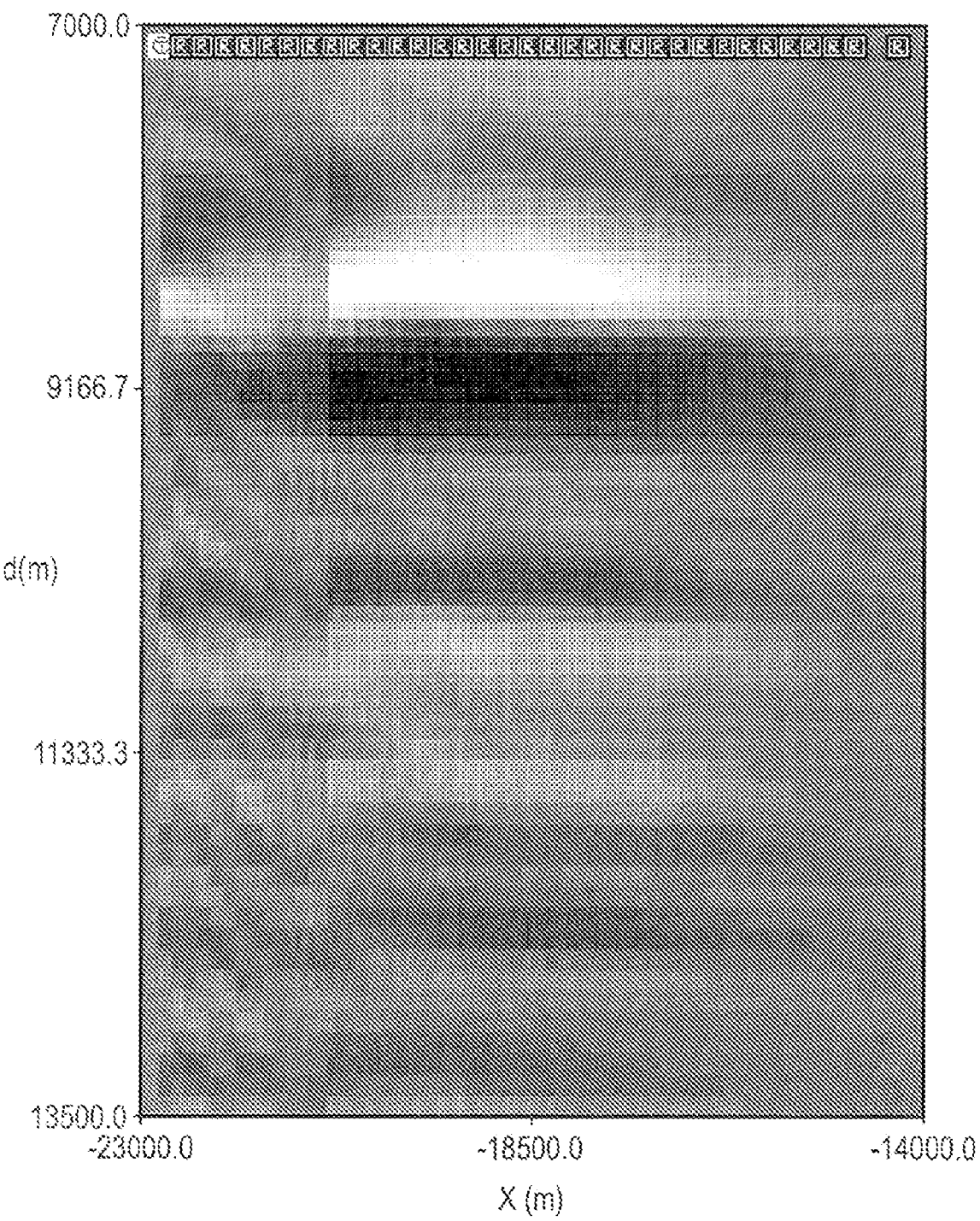
Figure 8D:
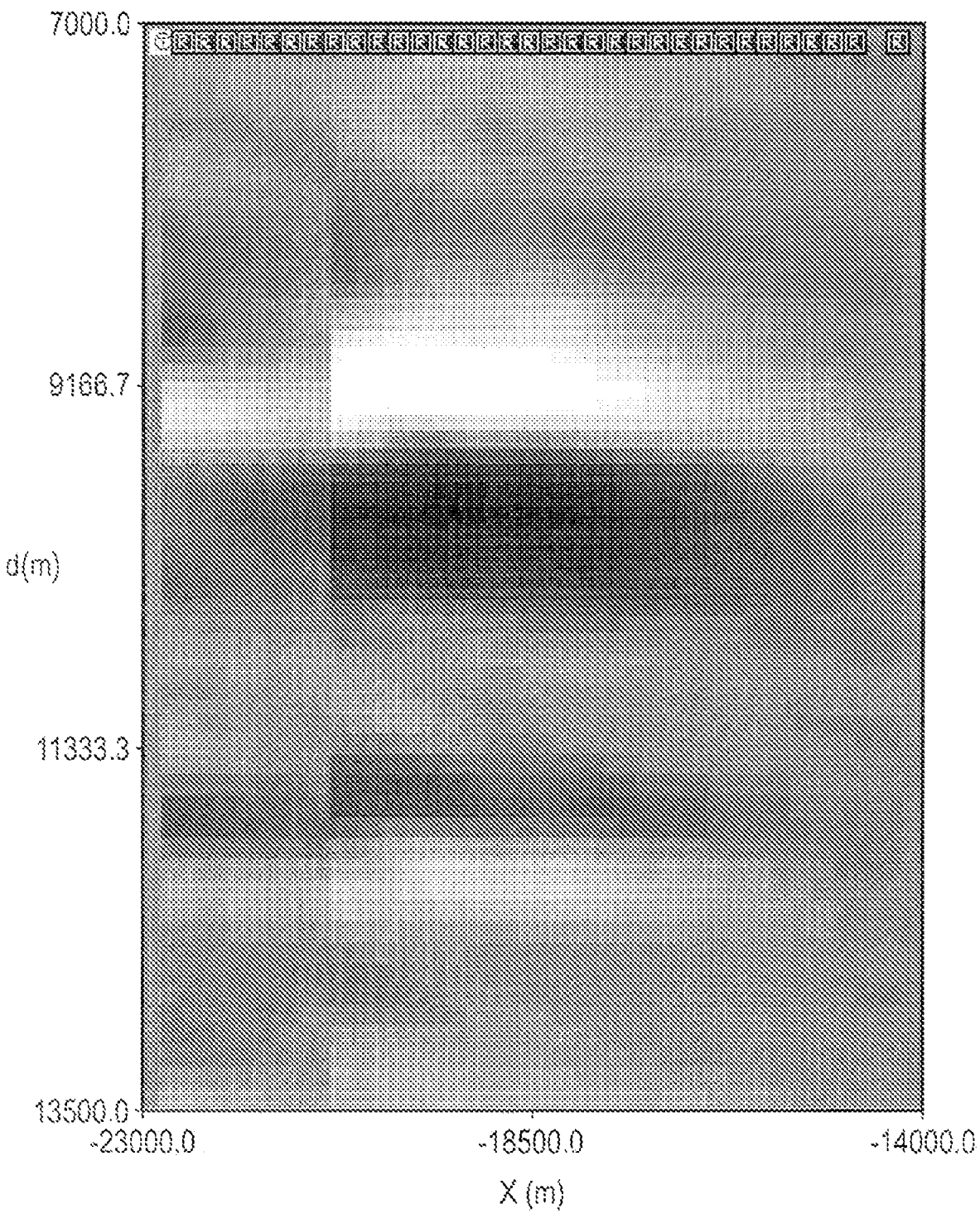
Figure 8E:
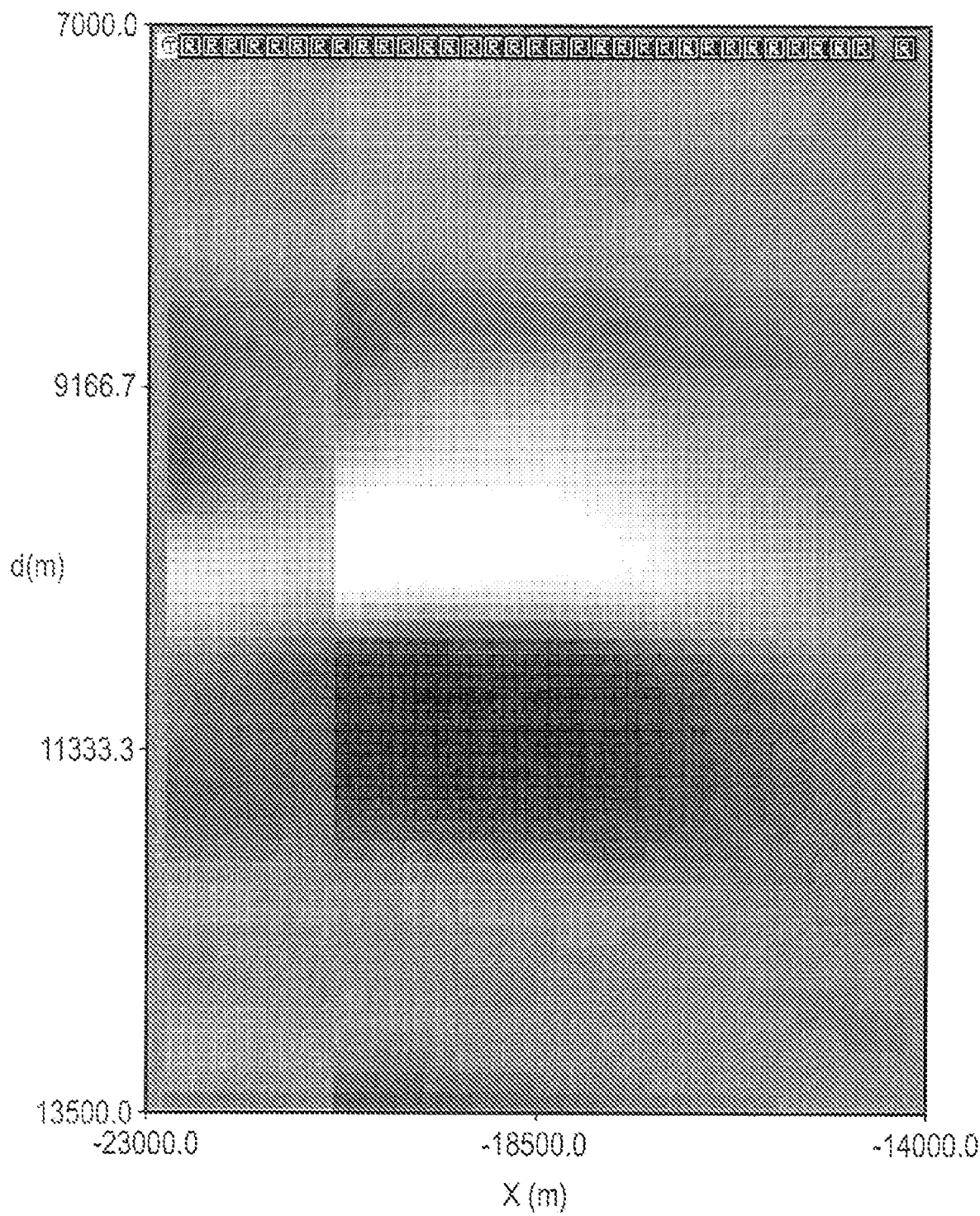

This is apparent from FIG. 8E where a uniform resistivity half-space start model of 2 Ωm is used rather than the more realistic value of 1 Ωm. The wedge 90 is accordingly calculated to be positioned at too deep a depth.

FIG. 8D again shows that a half-space start model having an appropriately selected resistivity (i.e. 1 Ωm in this case) provides images similar to those generated using an exact start model.

Figure 1:
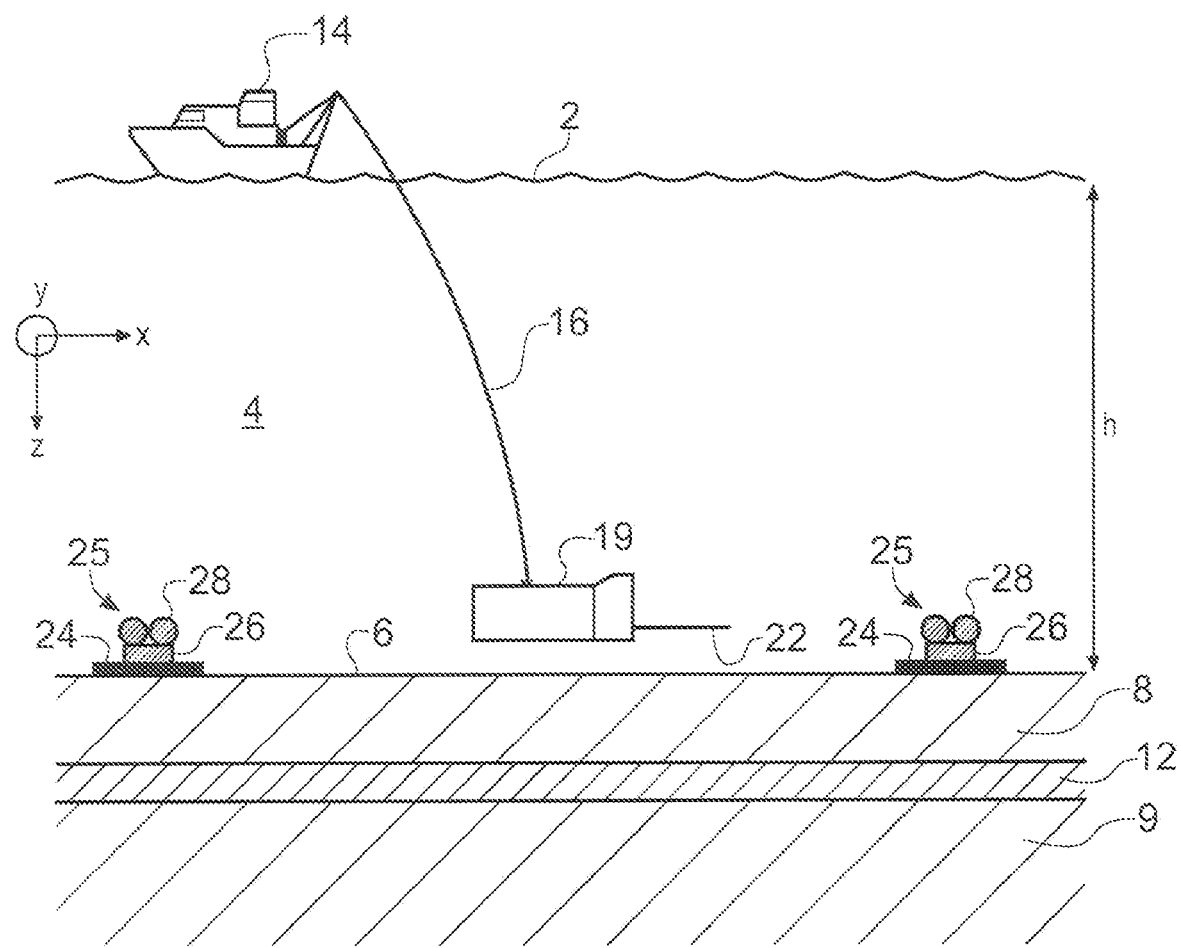
Figure 2:
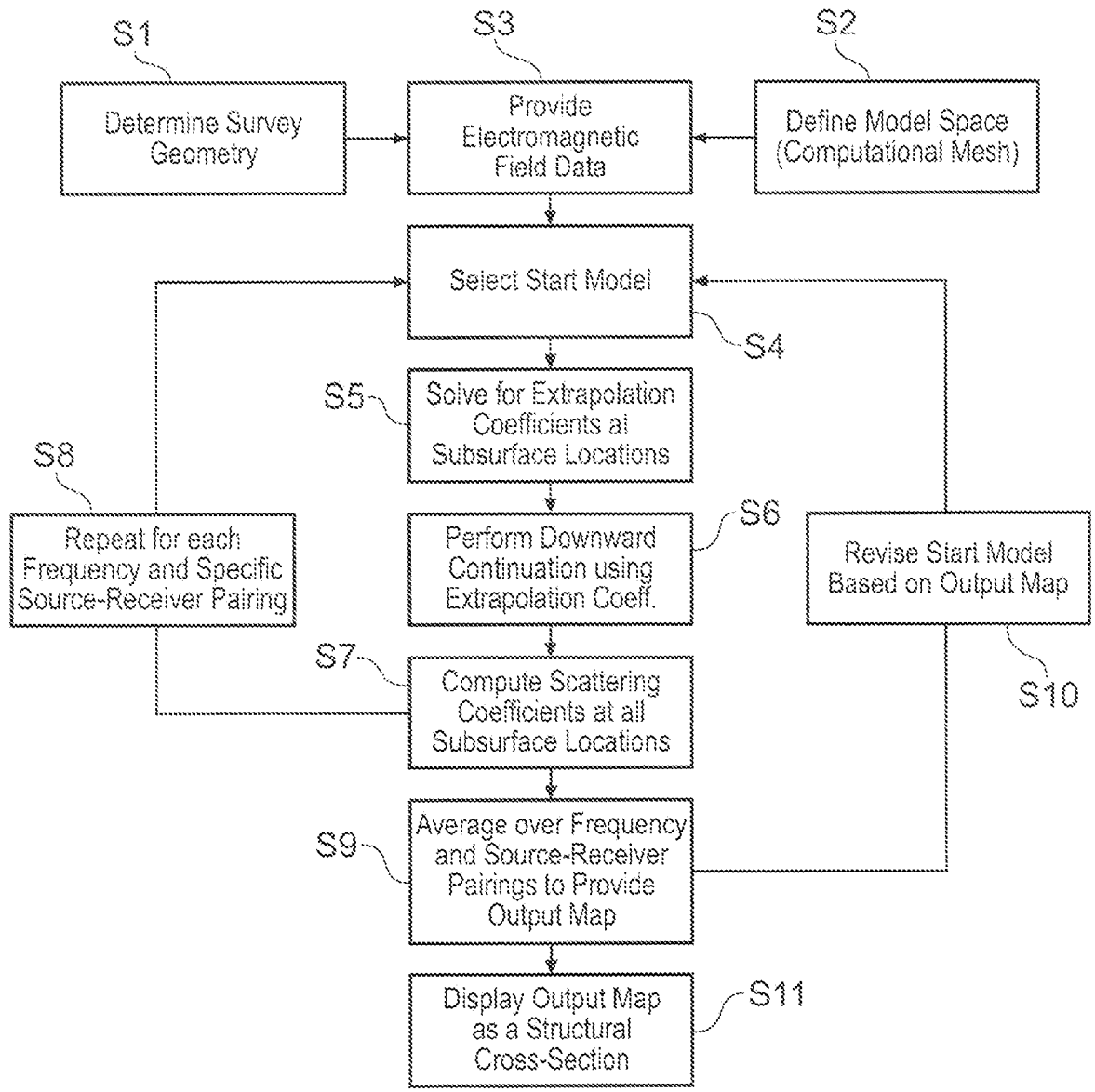
Figure 3A:
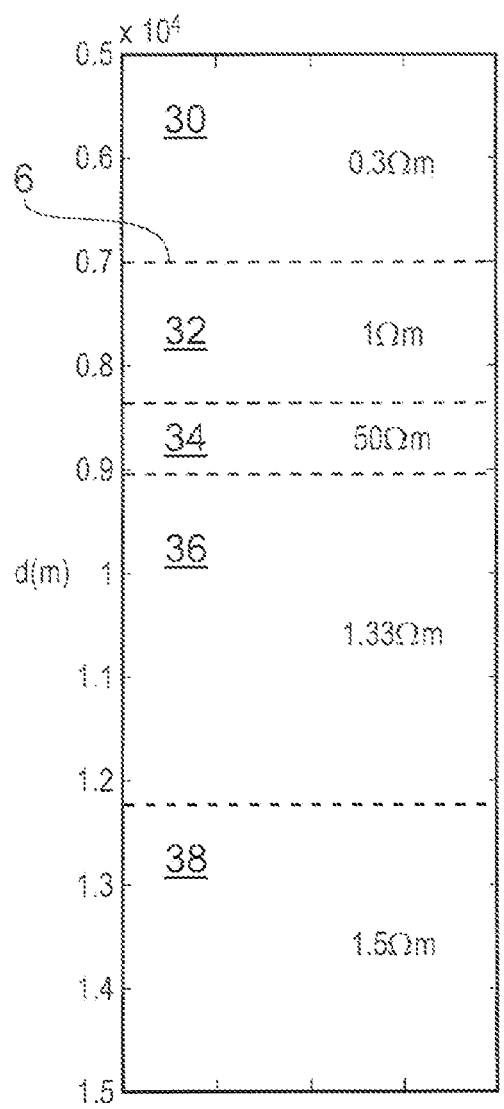
Figure 3B:
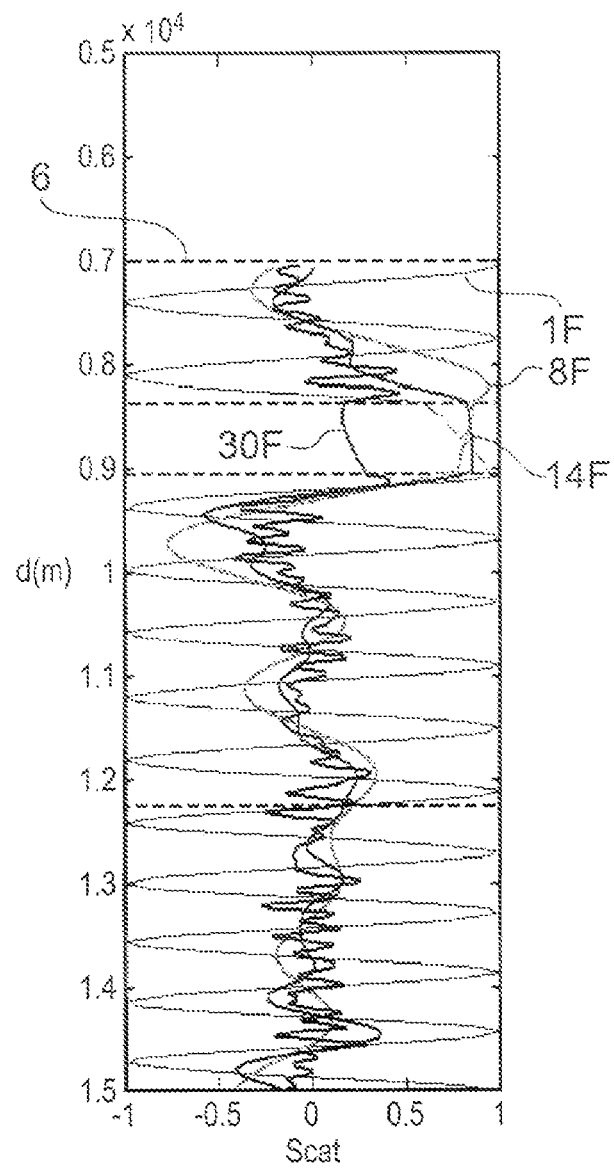
Figure 4A:
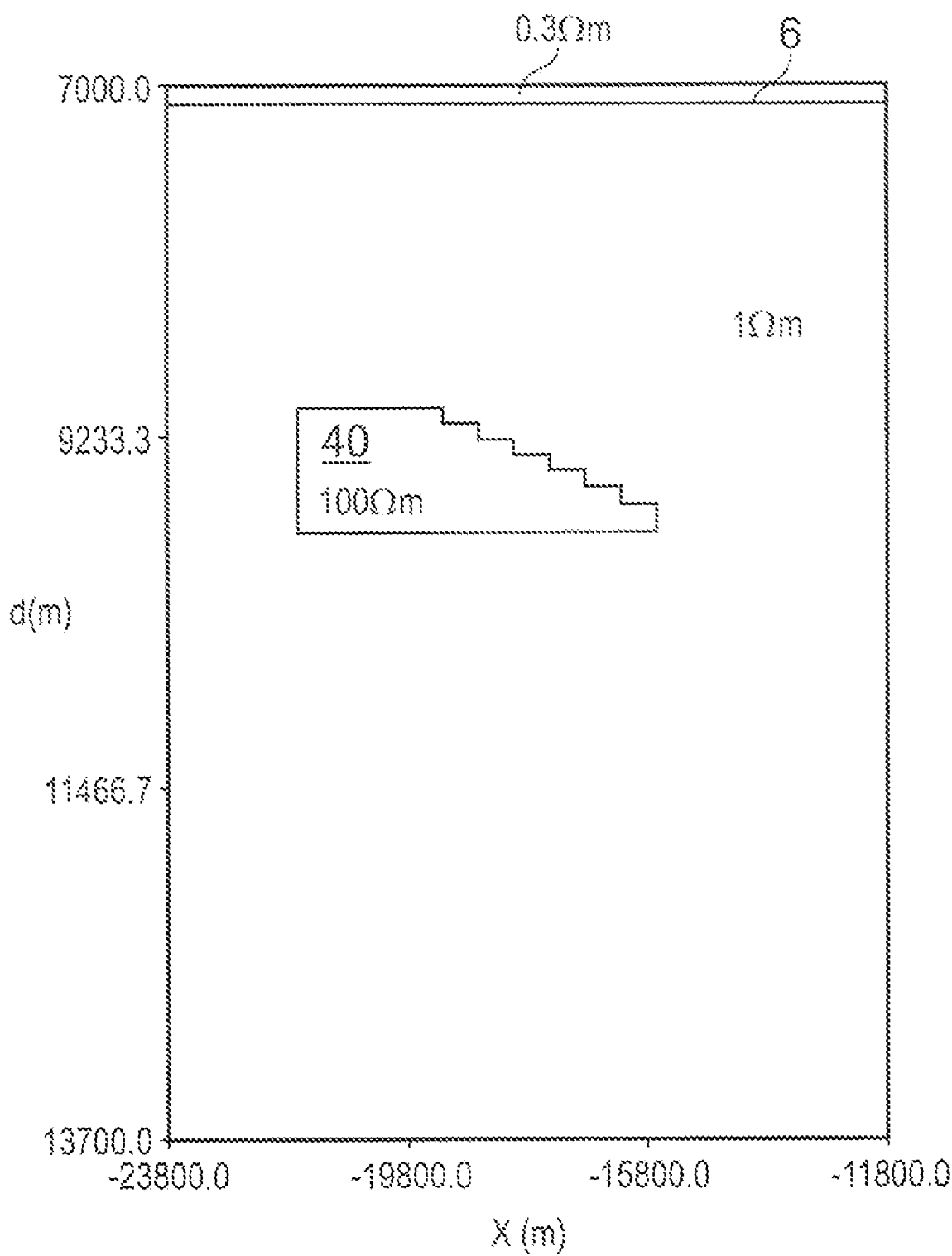
Figure 4B:
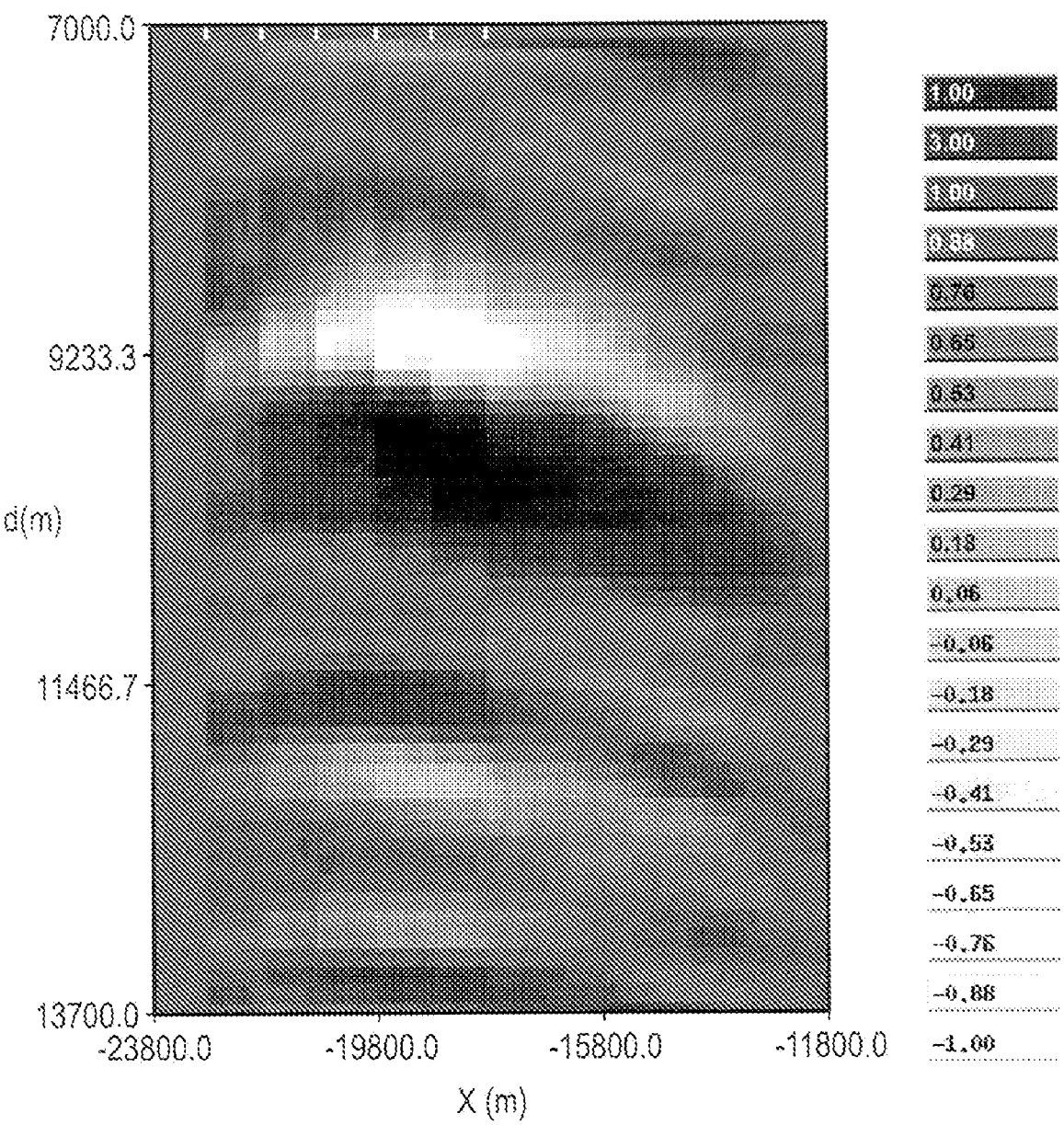
Figure 4C:
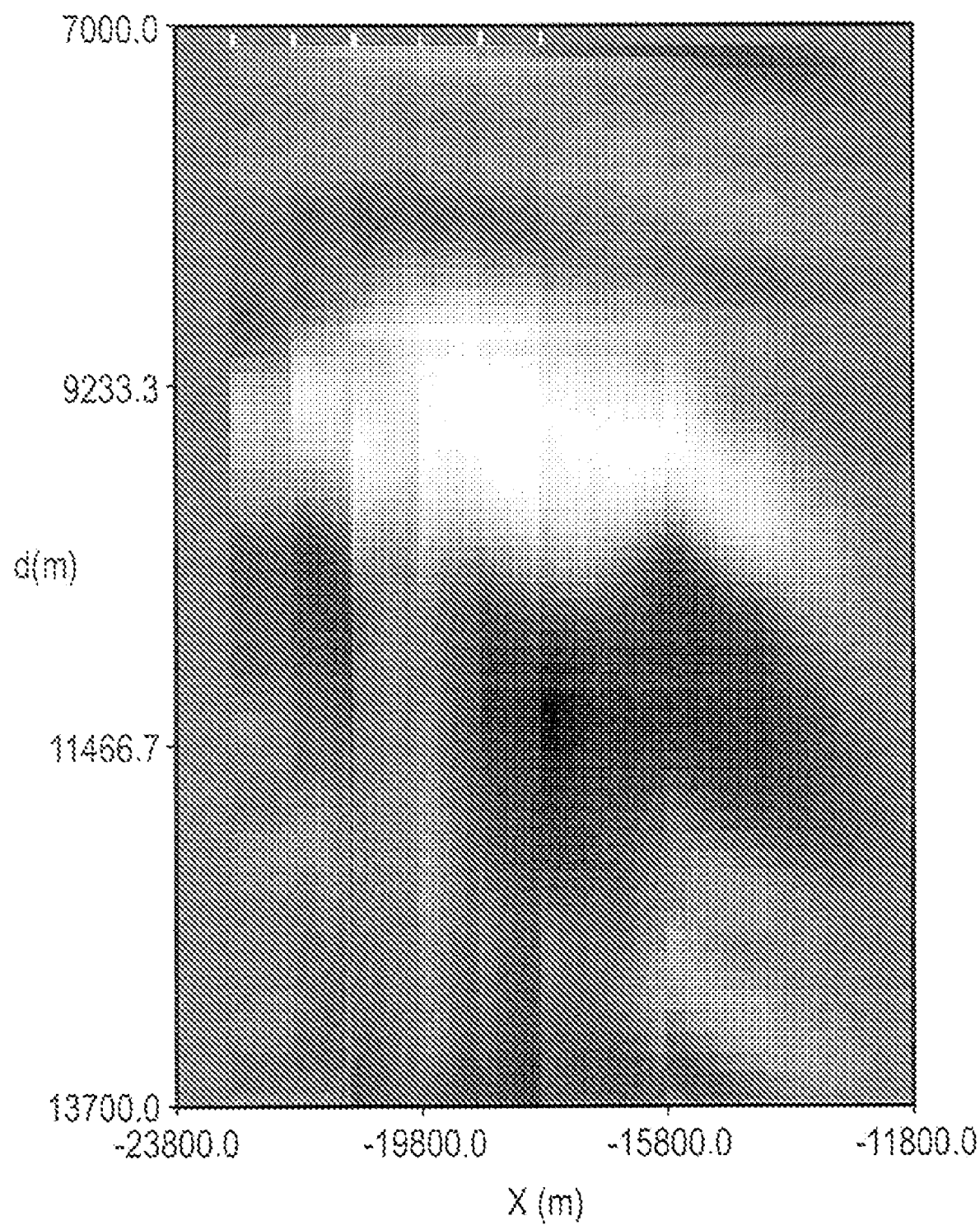
Figure 4D:
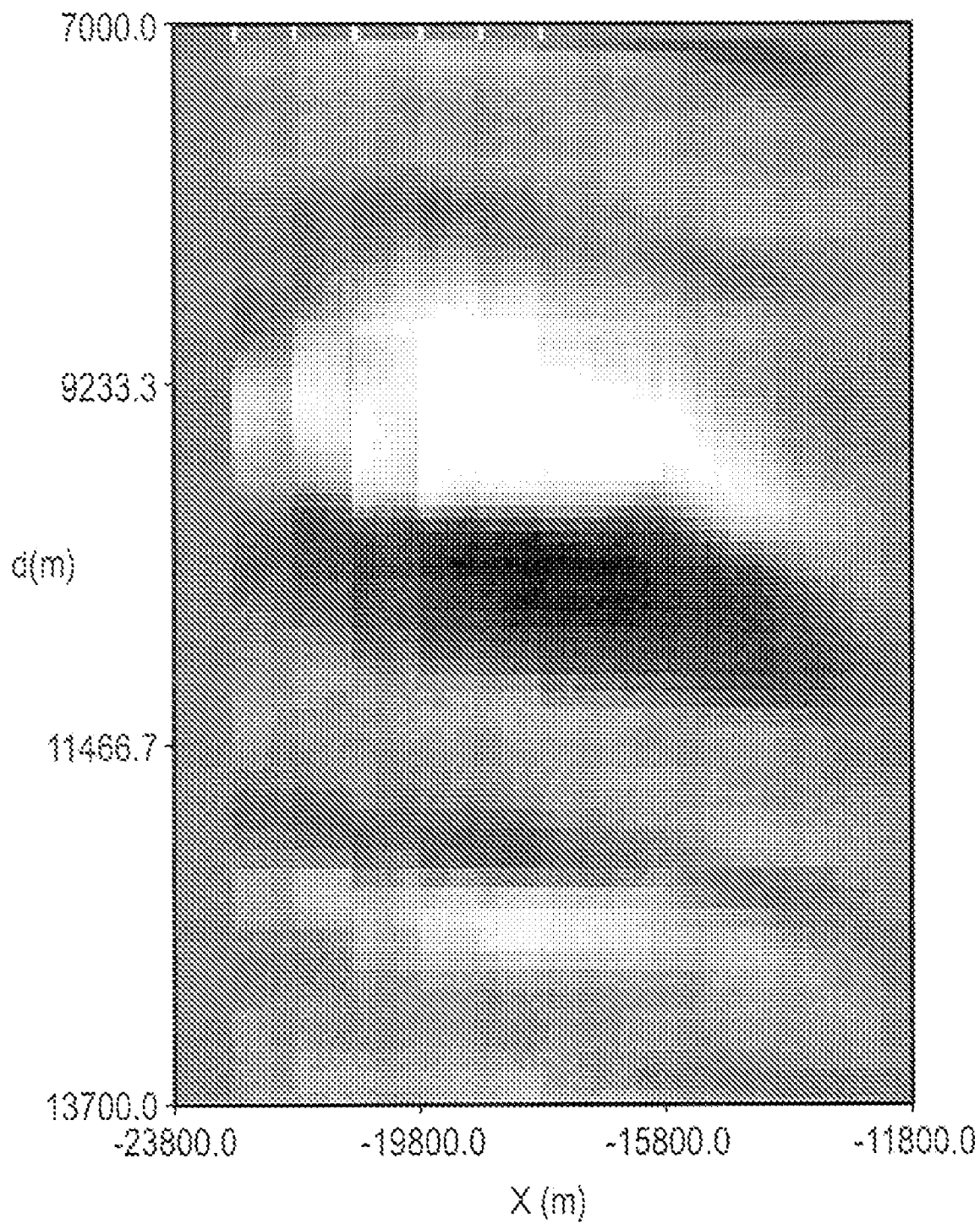
Figure 5A:
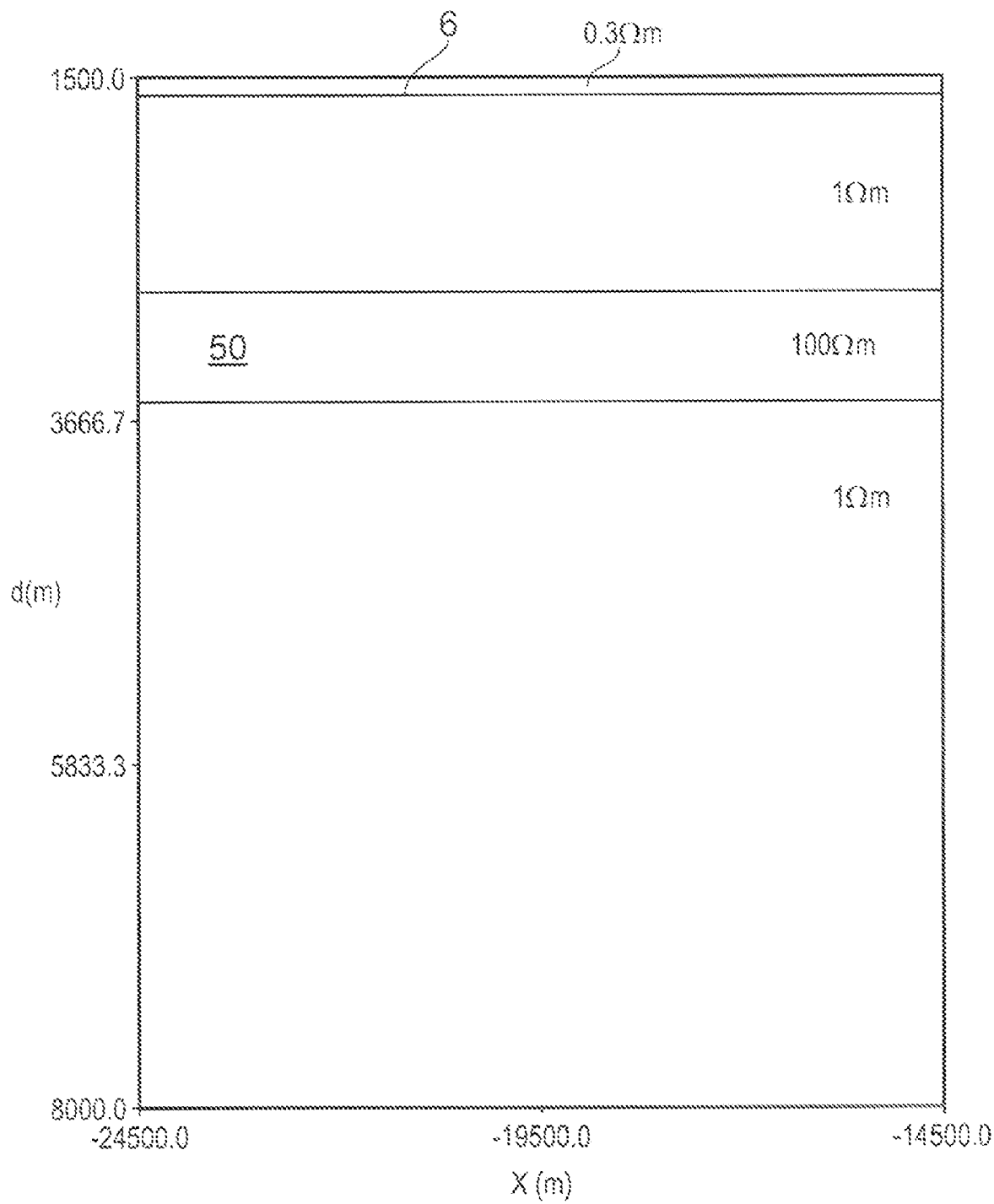
Figure 5B:
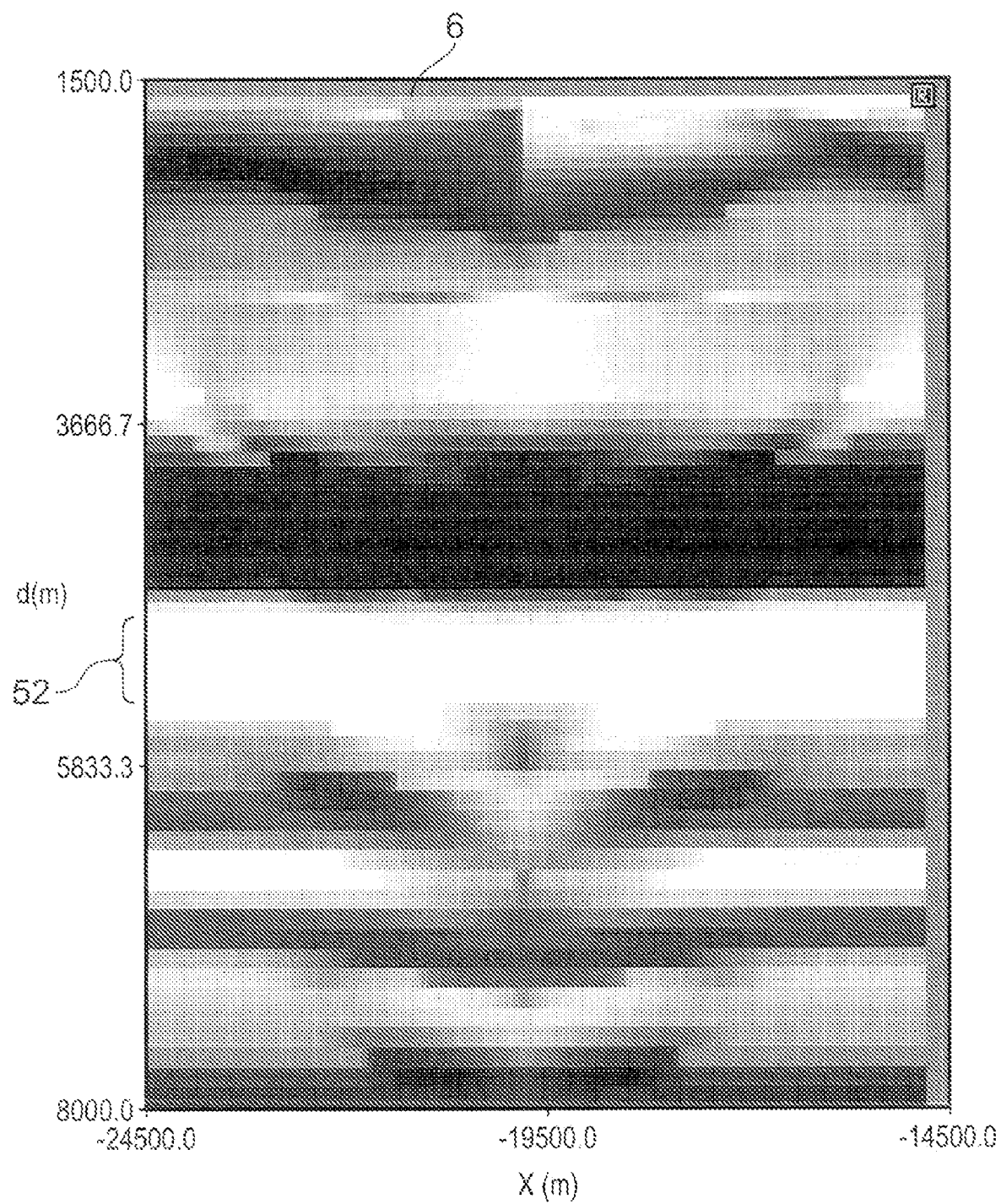
Figure 6A:
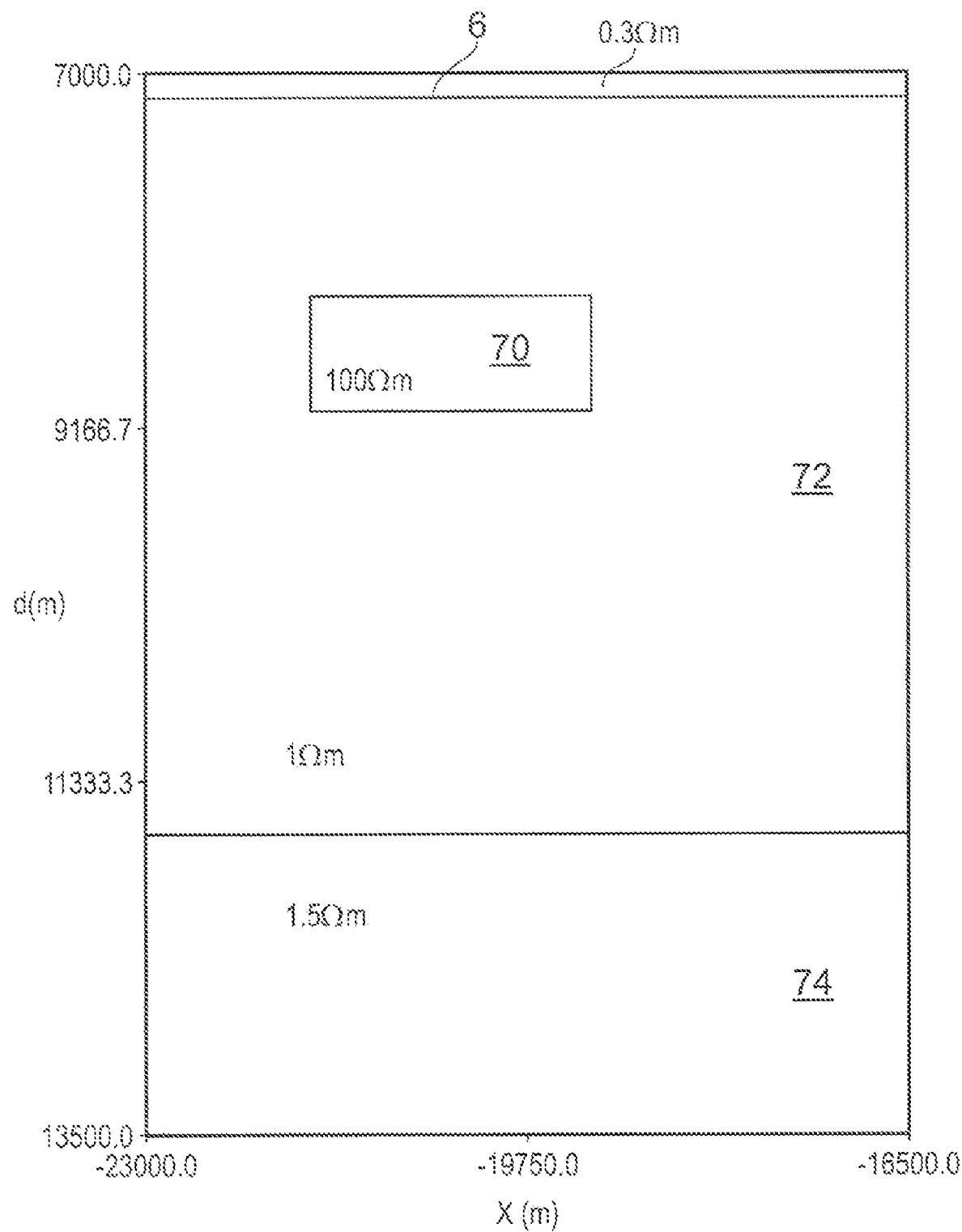
Figure 6B:
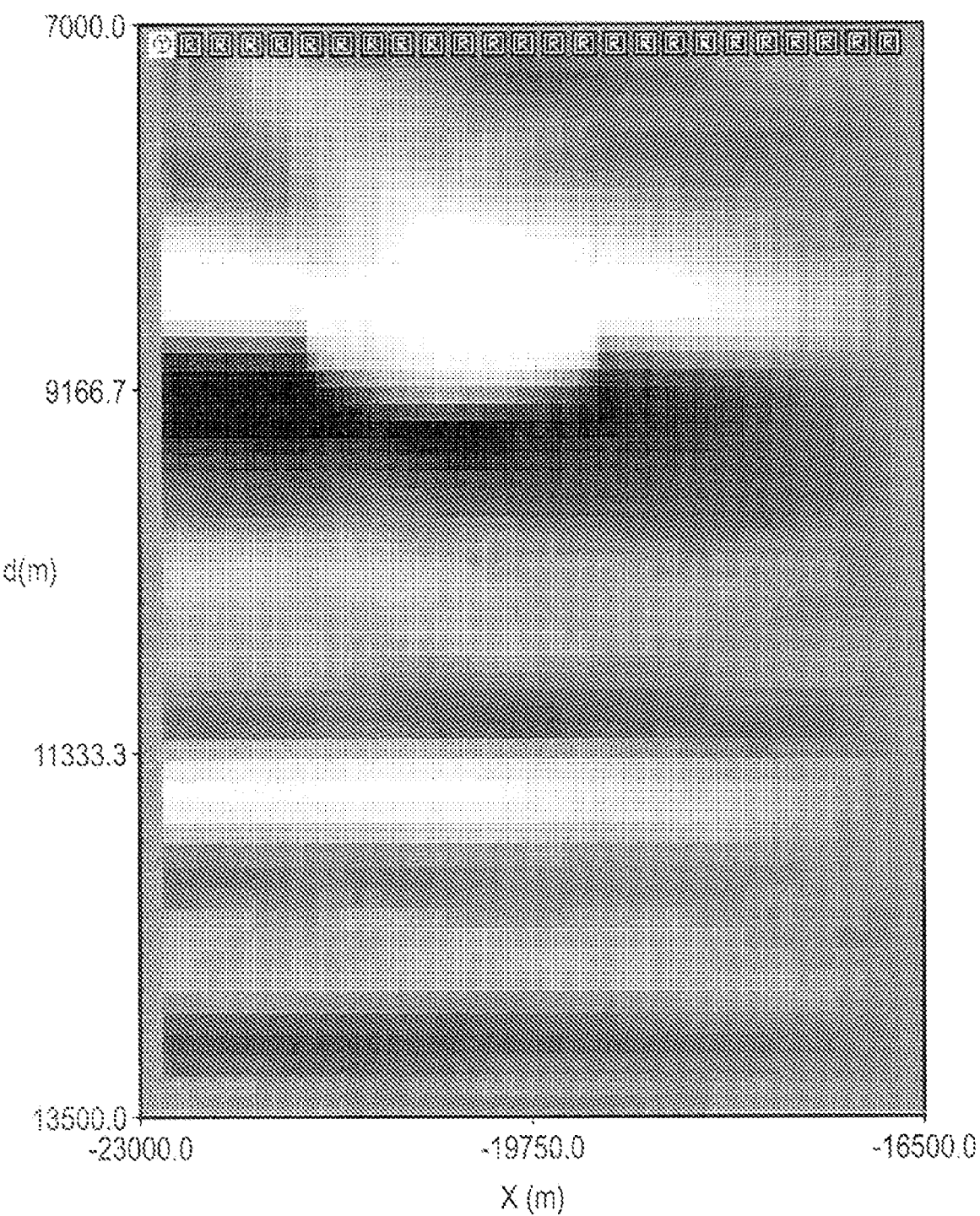
Figure 6C:
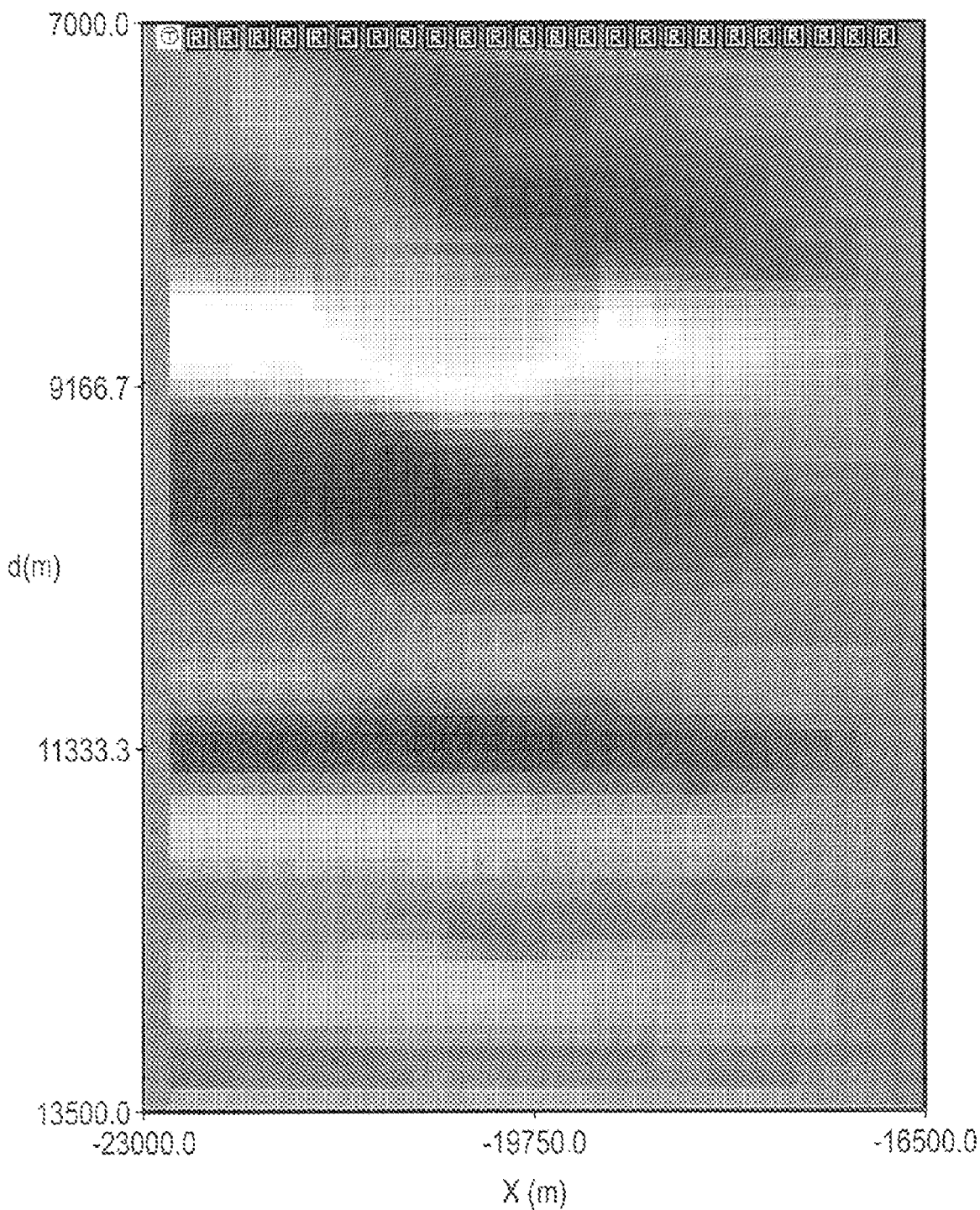
Figure 6D:
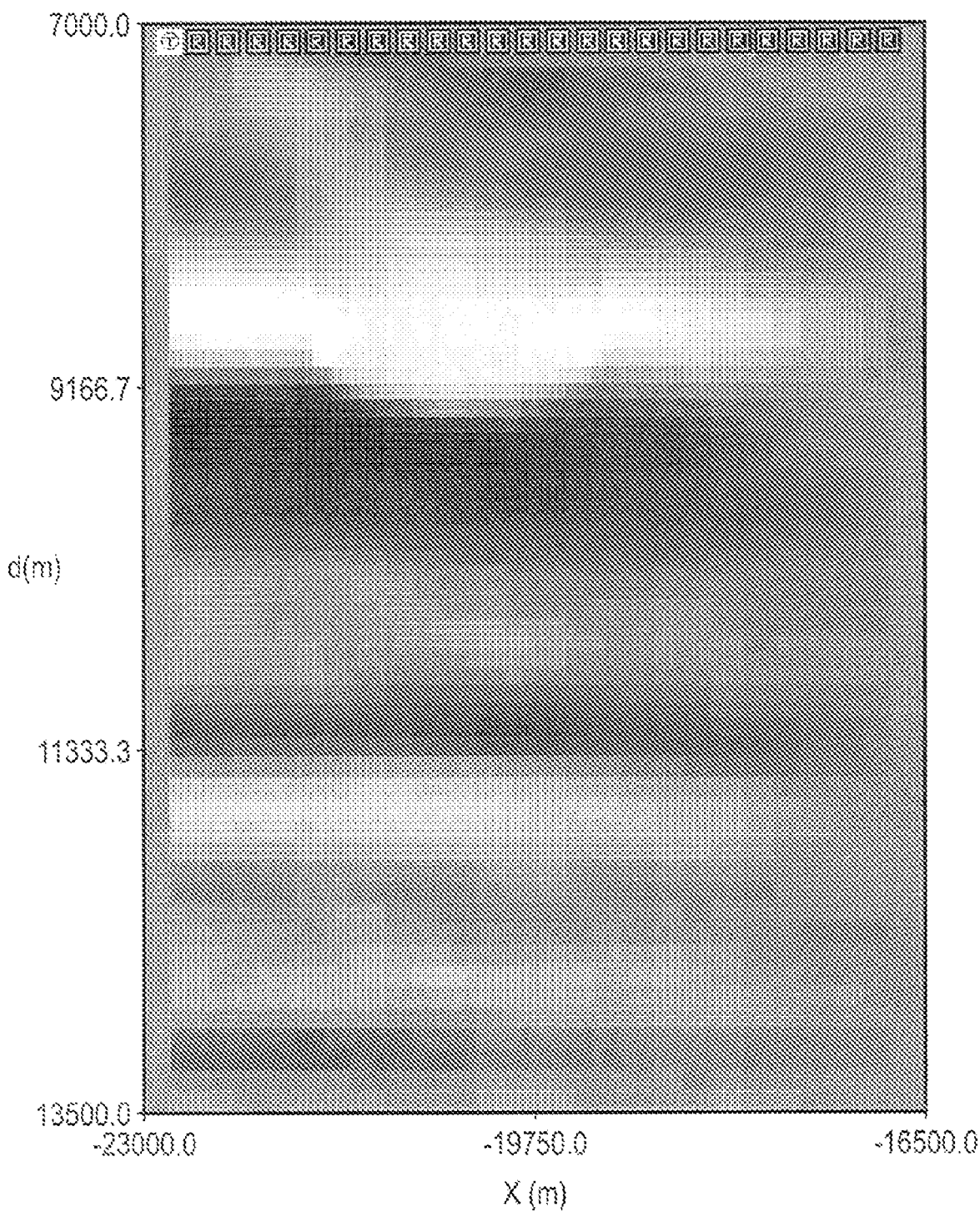
Figure 7A:
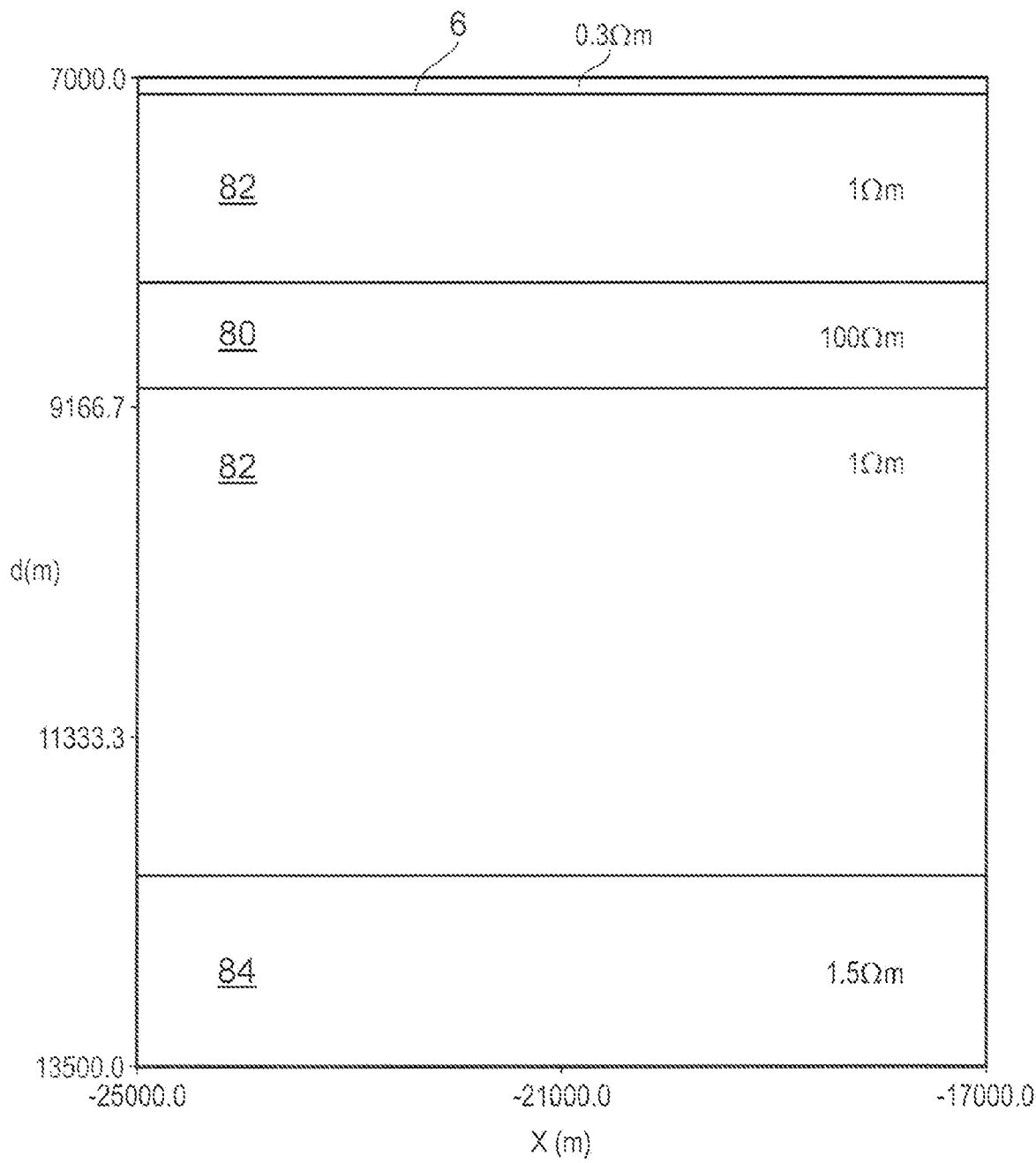
Figure 7B:
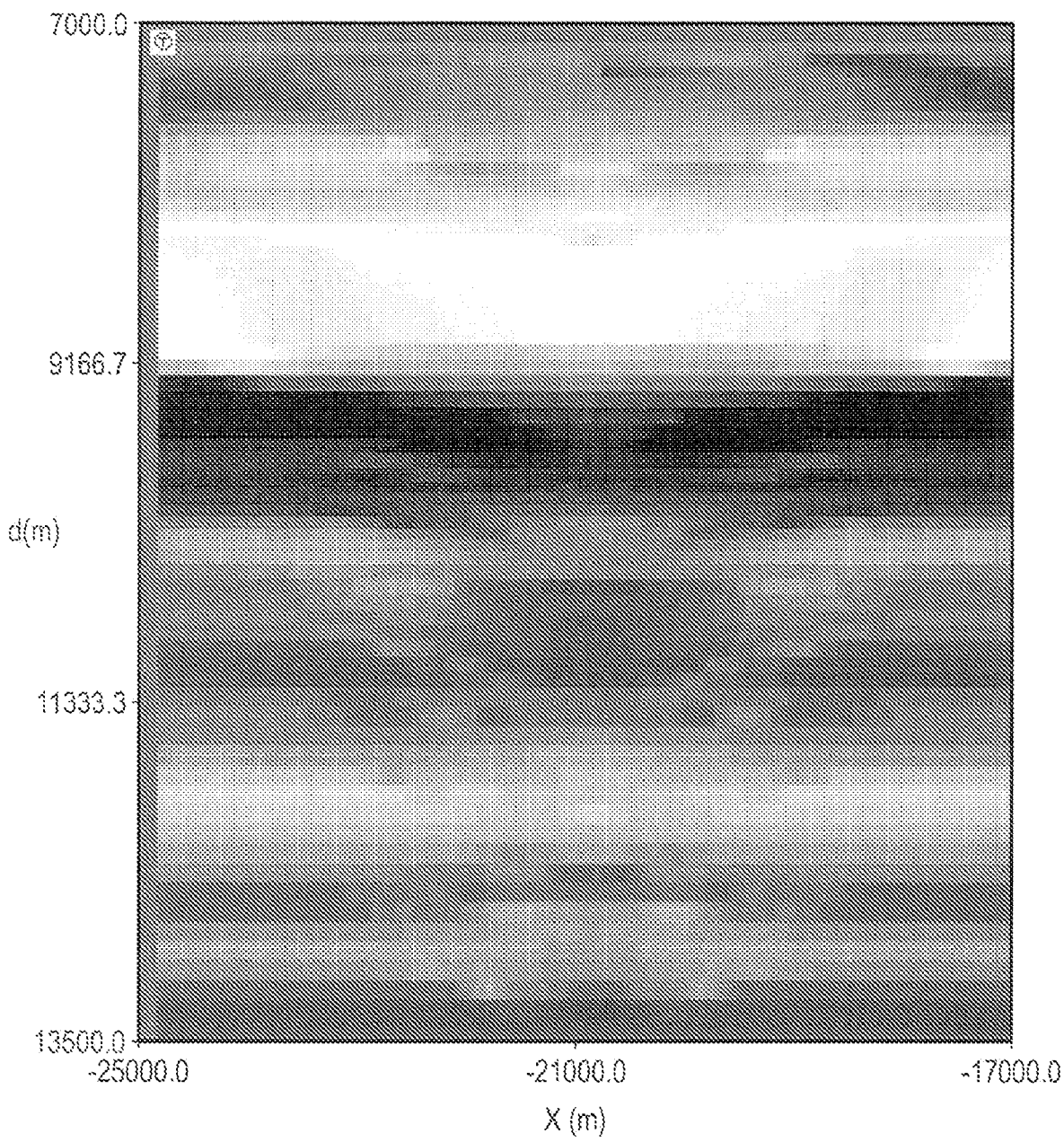
Figure 7C:
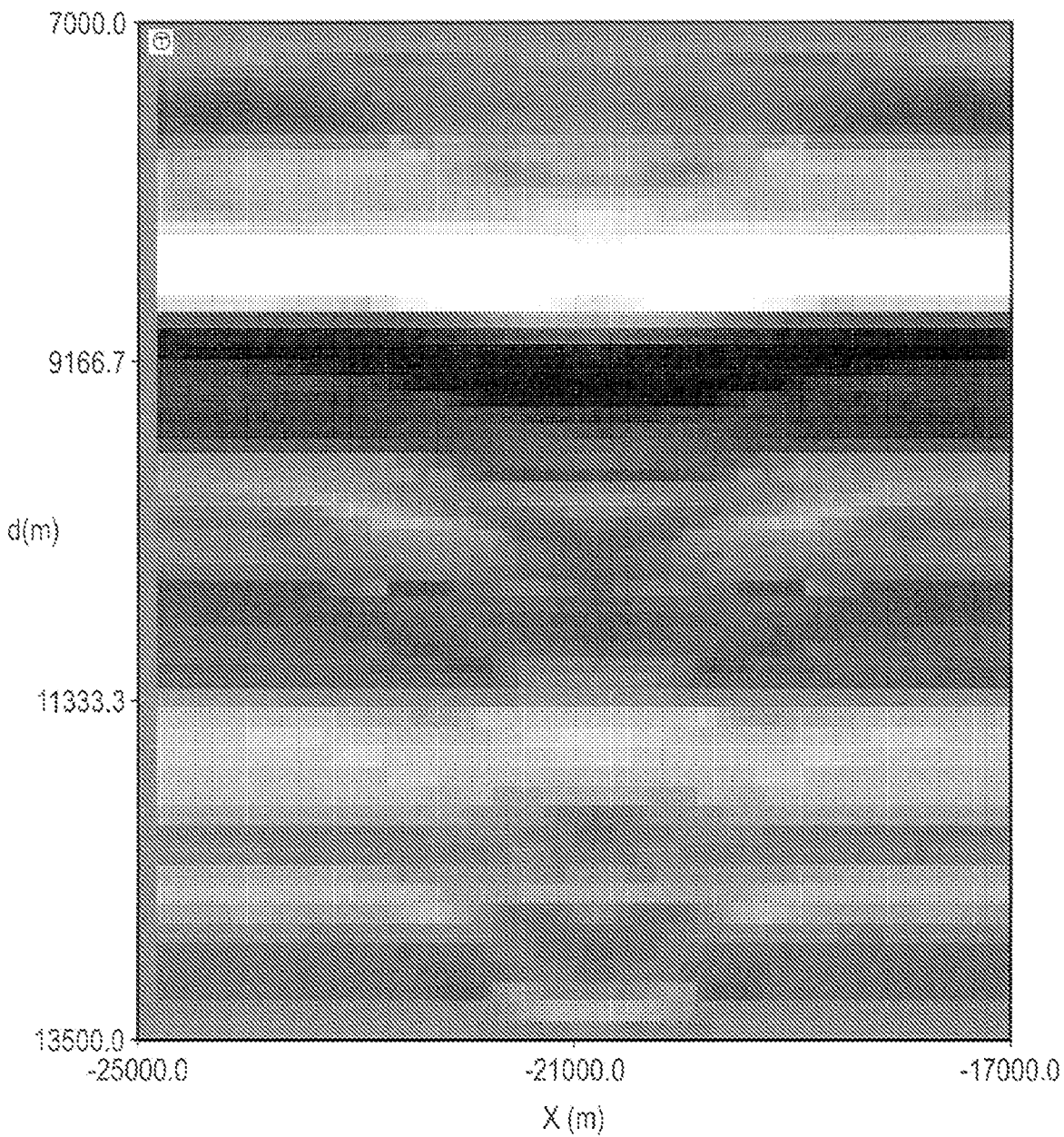

It is apparent from FIGS. 8C-8E that the effect of changing the resistivity of the half-space start model is to modify the depth of the wedge 90 rather than its geometry or horizontal position. In all cases, the 2-D wedge 90 is well resolved. In practice, an iterative imaging procedure, such as shown in FIGS. 4B-4D, may be used to better image complex structures. In any case, for the purposes of identifying hydrocarbon reservoirs which are to become targets for future drilling, horizontal position is more important than depth.

It will be understood that while the above description of analyzing CSEM survey data has focussed on data obtained from a towed source (transmitter), this is by way of example only. The method would also be applicable to data collected with towed receivers, with or without the source being towed. The method would also be applicable in a fixed installation. For example, the method could be used to monitor changes to a hydrocarbon reservoir from which hydrocarbon is being drawn. In such cases it will be appropriate to employ one (or more) source(s) in fixed positions relative to a receiver array rather than undertake frequent towed surveys. The source(s) could be anchored to the seafloor or suspended from an oil-rig platform, for example. In other examples, the source(s) could be placed in a well or borehole, e.g. a geotechnical borehole. In the case of a producing oil field, the subterranean structures are likely to be well known already from prior geophysical surveys and drilling results. Indeed, prior geophysical and geological information from the oil field can be used to construct the start model for the wavefield imaging.

Finally, it will be understood that the invention is equally applicable to surveying of freshwater, for example large lakes or estuaries, so that references to seafloor, seawater etc. should not be regarded as limiting and should be interpreted as covering lakebed, riverbed etc.

REFERENCES

[1] GB 2 382 875 A (University of Southampton)
[2] WO 02/14906 A (Statoil ASA)
[3] Eidesmo, T., Ellingsrud, S., MacGregor, L. M., Constable, S., Sinha, M. C., Johansen, S., Kong, F-N & Westerdahl, H., Sea Bed Logging (SBL), a new method for remote and direct identification of hydrocarbon filled layers in deepwater areas. First Break, 20, 2002, 144-152
[4] Ellingsrud, S., Eidesmo, T., Johansen, S., Sinha, M. C., MacGregor, L. M. & Constable, S., Remote sensing of hydrocarbon reservoirs by seabed logging (SBL): Results from a cruise offshore Angola. The Leading Edge, 21, 2002, 972-982
[5] GB 2 390 904 A (University of Southampton)
[6] Claerbout, J. F., 1970, Course grid calculations of wave in inhomogeneous media with application to delineation of complicated seismic structure, *Geophysics*, 35, 407-418
[7] Lee, S., McMechan, G. A., & Aiken, C. L., 1987, Phase-field imaging: The electromagnetic equivalent of seismic migration, *Geophysics*, 52, 678-693
[8] Zhdanov, M. S., Traynin, P., & Booker, J. R., 1996, Underground imaging by frequency-domain electromagnetic migration, *Geophysics*, 61, 666-682
[9] Claerbout, J. F., 1976, *Fundamentals of Geophysical Data Processing*, McGraw-Hill, New York, Chpts. 10-11.
[10] Biondo, B, 2003, Equivalence of source-receiver migration and shot-profile migration, *Geophysics*, 68, 1340-1347.

What is claimed is:

1. A method of analyzing results from an underwater electromagnetic survey of an area that is thought or known to contain a subterranean hydrocarbon reservoir, comprising:
providing electromagnetic field data obtained from an underwater controlled source electromagnetic (CSEM) survey at a plurality of discrete frequencies between 0.01 Hz and 60 Hz for specific source and receiver locations;
performing a migration of the data for the source and receiver locations; and
applying an imaging condition to the migrated data at each subsurface location to produce an image parameter which represents a desired physical property of the subsurface.

2. A method according to claim 1, wherein the plurality of discrete frequencies consists of between 3 and 15 frequencies.

3. A method according to claim 1, wherein the plurality of discrete frequencies consists of up to 20 frequencies.

4. A method according to claim 1, wherein the plurality of discrete frequencies consists of up to 30 frequencies.

5. A method according to claim 1, wherein a start model for the migration comprises a uniform resistivity model.

6. A method according to claim 1, wherein prior geological information of the area surveyed is used to construct a start model for the migration.

7. A method according to claim 1, wherein the method is executed multiple times, the output map from one execution being employed as a start model for the wavefield extrapolation of a subsequent execution.

8. A method according to claim 1, wherein the desired physical property of the subsurface is conductivity.

9. A method according to claim 1, further comprising performing an inversion analysis, wherein the inversion analysis is constrained by the image parameter at locations in the subsurface.

10. A method according to claim 1, further comprising displaying an image representing the image parameter at locations in the sub-surface.

11. A method according to claim 10, wherein the image is a three-dimensional image.

12. A method according to claim 1, wherein at least one of the discrete frequencies is a harmonic of another of the discrete frequencies.

13. A method according to claim 1, wherein the electromagnetic field data are obtained by multiple CSEM surveys of the area undertaken at different times.

14. A computer program product bearing machine readable instructions for implementing the method of claim 1.

15. A computer apparatus loaded with machine readable instructions for implementing the method of claim 1.

16. A method of performing an underwater CSEM survey of an area that is thought or known to contain a subterranean hydrocarbon reservoir, comprising:
providing at least one source and at least one receiver for transmission and detection of electromagnetic signals;

obtaining electromagnetic field data with transmission and detection at a plurality of discrete frequencies between 0.01 Hz and 60 Hz for specific source and receiver locations;

performing a migration of the data for the source and receiver locations; and applying an imaging condition to the migrated data at each subsurface location to produce an image parameter which represents a desired physical property of the subsurface.

17. A method according to claim 16, wherein the plurality of discrete frequencies consists of between 3 and 15 frequencies.

18. A method according to claim 16, wherein the plurality of discrete frequencies consists of consists of up to 20 frequencies.

19. A method according to claim 16, wherein the plurality of discrete frequencies consists of up to 30 frequencies.

20. A method according to claim 16, wherein data at different ones of the plurality of discrete frequencies are obtained at the same time with a single source.

21. A method according to claim 16, wherein data at different ones of the plurality of discrete frequencies are obtained at the same time with multiple sources.

22. A method according to claim 16, wherein data at different ones of the plurality of discrete frequencies are obtained at different times with a single source.

23. A method according to claim 16, wherein at least one of the discrete frequencies is a harmonic of another of the discrete frequencies.

24. A method according to claim 16, wherein the method is executed multiple times to monitor changes in the area surveyed.

25. A method according to claim 24, wherein the area surveyed is a hydrocarbon reservoir from which hydrocarbon is being drawn.

26. A method for obtaining hydrocarbon from an area that contains a subterranean hydrocarbon reservoir, comprising:

performing an underwater controlled source electromagnetic (CSEM) survey of the area to provide electromagnetic field data at a plurality of discrete frequencies between 0.01 Hz and 60 Hz for specific source and receiver locations;

performing a migration of the data for the source and receiver locations; and applying an imaging condition to the migrated data at each subsurface location to produce an image parameter which represents a desired physical property of the subsurface;

identifying the hydrocarbon reservoir from the values of the image parameter subsurface locations; and penetrating the identified hydrocarbon reservoir with a hydrocarbon-producing well.

* * * * *